Patented Sept. 26, 1939

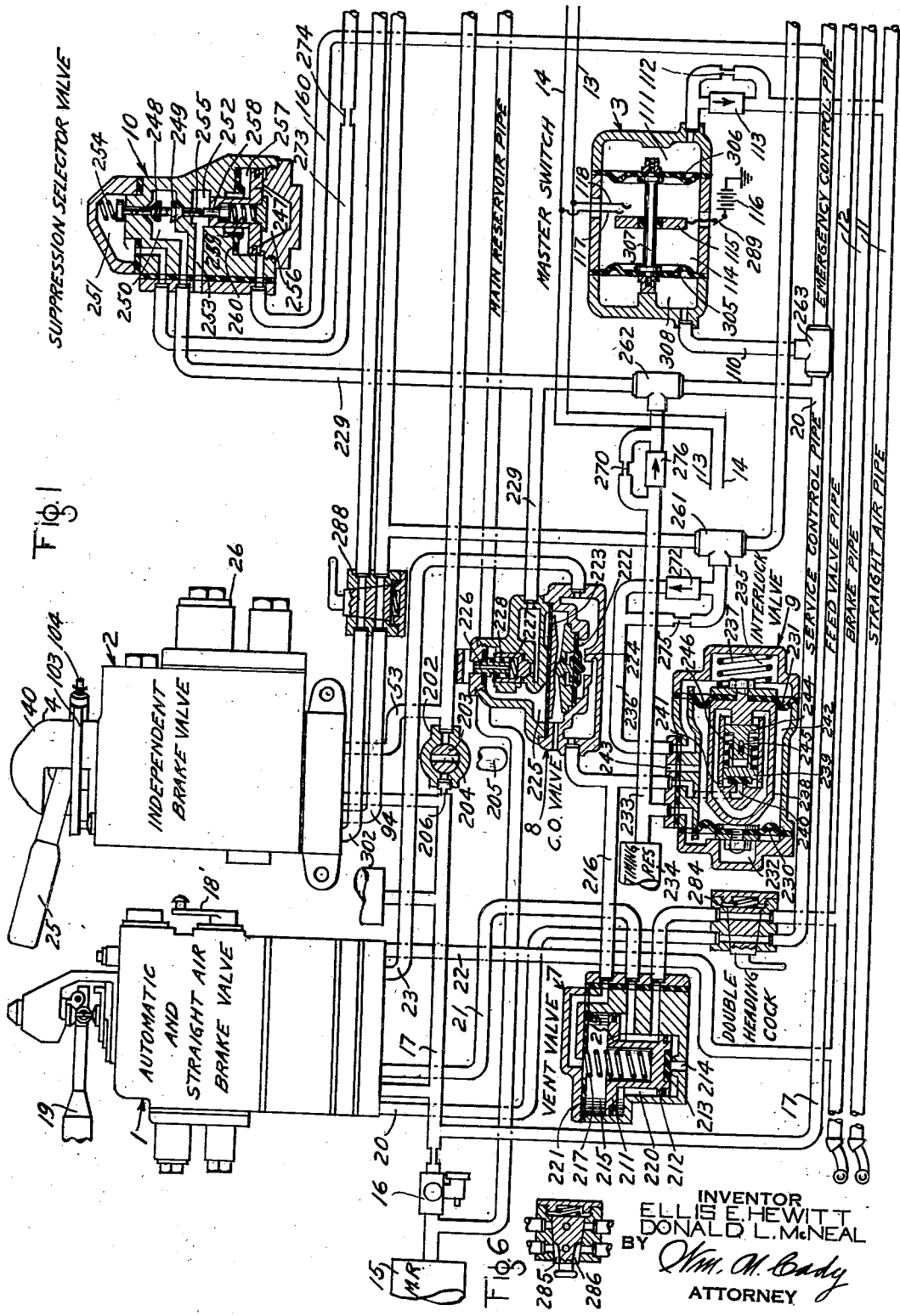

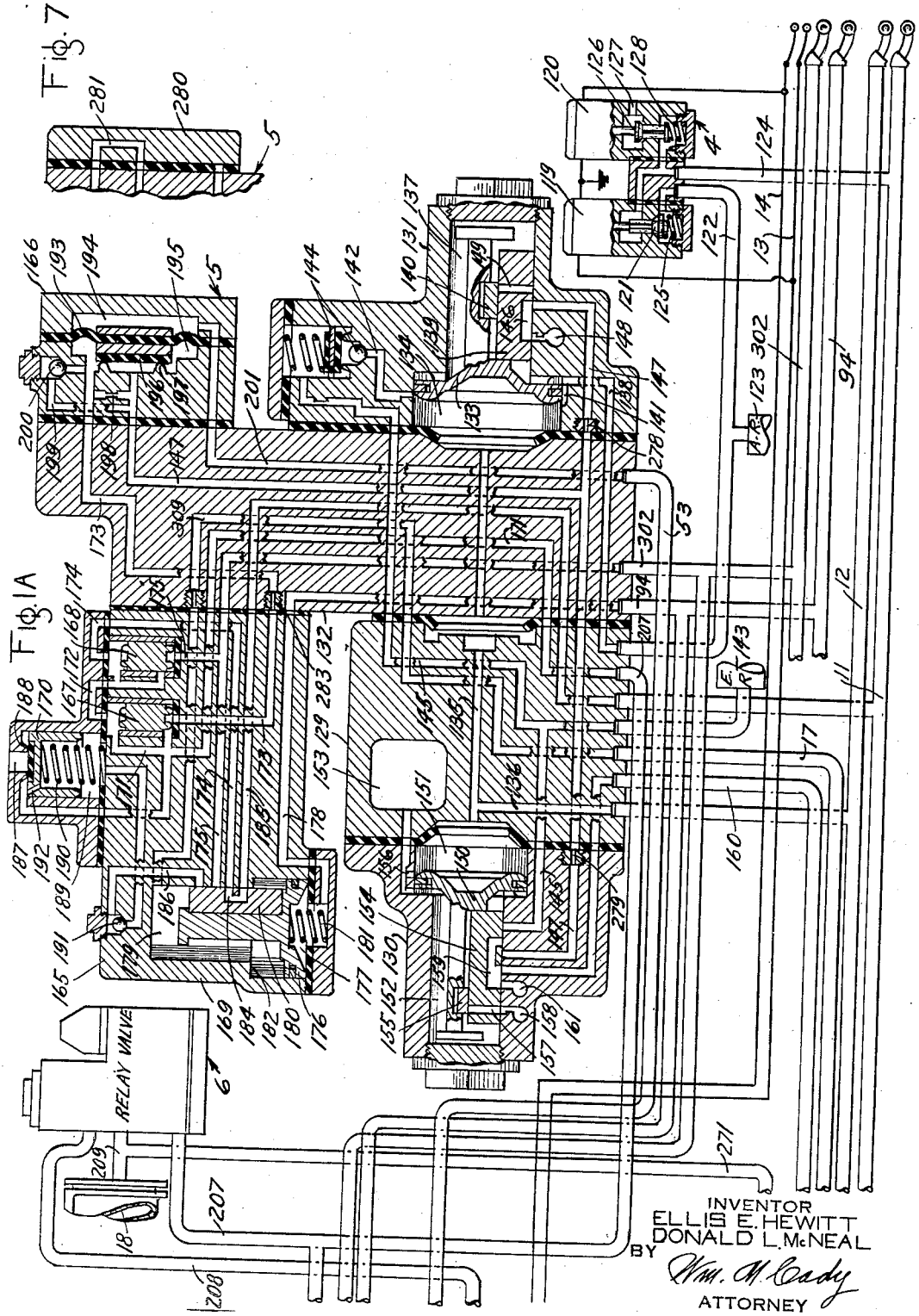

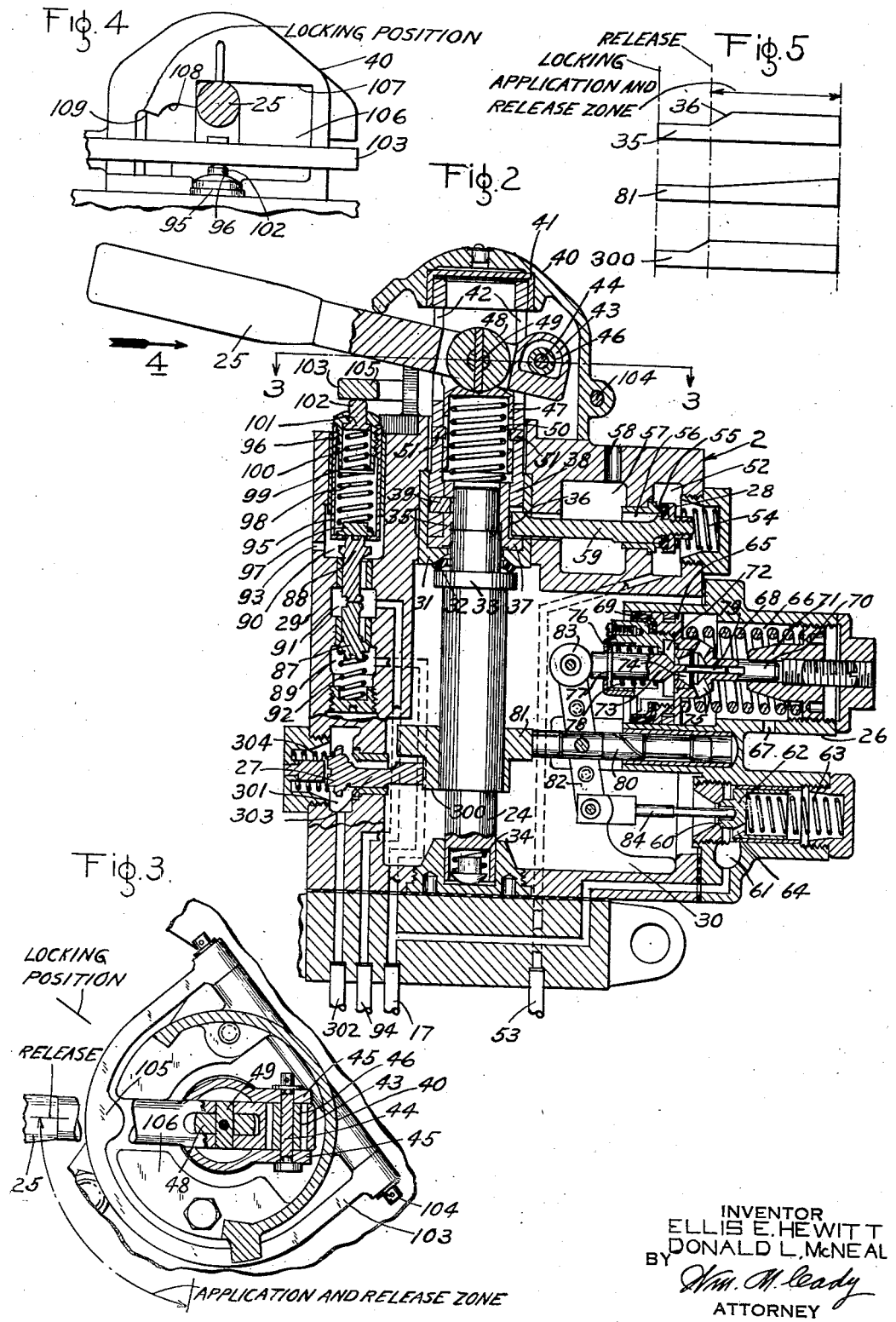

2,173,940

UNITED STATES PATENT OFFICE 2,173,940

LOCOMOTIVE BRAKE EQUIPMENT

Ellis E. Hewitt, Edgewood, and Donald L. McNeal, Wilkinsburg, Pa., assignors to The Westinghouse Air Brake Company, Wilmerding, Pa., a corporation of Pennsylvania Application October 21, 1937, Serial No. 170,238

76 Claims. (Cl. 303—26)

This invention relates to fluid pressure brakes and more particularly to fluid pressure brake equipment for railway locomotives.

Until quite recently railway locomotives were equipped with brake control equipment which was so arranged that the brakes on either standard passenger or standard freight trains could be properly controlled from any locomotive so equipped. Heretofore, both passenger and freight trains were provided with brake equipments operating on the well-known automatic principle only. Provision was made on the locomotive, however, for the independent control of the locomotive brakes, so as to protect the locomotive driver wheels and to use the inertia of the locomotive to the best advantage in handling the train.

Within recent years a new series of passenger trains have been developed for operation at ultra high speeds. The operation of trains at such high speeds has necessitated the development of a new type of brake equipment. The brake equipments for such trains are of the dual control type, that is, they include an electropneumatic portion adapted to operate on the well-known straight air principle, in addition to a pneumatic portion adapted to operate on the automatic principle. Further, because of the necessity of guarding against a failure of the brakes, various safety devices and interlocks have been provided in order to reduce to a minimum the possibility of failure of the brakes on such trains.

As a result of the experience gained from the operation of high speed trains equipped with combined straight air and automatic brake equipments, there has been developed a new brake equipment for passenger cars which may be adapted for either combined straight air and automatic control or for automatic control alone. The features of this new equipment are described and claimed in our copending application, Serial No. 160,562, filed August 24, 1937. As fully explained in our copending application, the equipment may be installed to operate as a purely automatic system, but may be readily changed over at any time to operate as a combined straight air and automatic system.

The heretofore and still widely employed standard brake equipment for passenger cars is that commonly known as the "UC" equipment. This equipment operates on the automatic principle only. The new passenger car equipment as set forth in our copending application, is adapted, when operated as an automatic equipment, to function in complete harmony with the "UC" equipment. Since the "UC" equipment has no provision for operation by straight air control, it will be apparent that where this control is required passenger cars equipped with the "UC" equipment cannot be employed. In cases where straight air control is required it is preferred that passenger cars be equipped with means providing for both straight air and automatic control of the car brakes, such as is incorporated in the brake equipment of our copending application.

In addition to the newly developed passenger car equipment above referred to, thare was also recently developed a new equipment for freight cars known as the "AB" equipment. The characteristics of this equipment are somewhat different from either the "UC" equipment or those proposed for the ultra high speed trains.

It is apparent that for some time to come there will be at least four different types of car brake equipments which will need be controlled by the brake control equipment on the locomotive. In the first place, there will be the now standard "UC" equipment for passenger cars, as well as the now standard "AB" equipment for freight cars. In addition, there will be (and there are now in operation) cars equipped with the new equipment as disclosed in our copending application, conditioned for automatic control only; and there will also be other cars equipped with our new brake equipment conditioned for both straight air and automatic control.

It is, of course, probable that eventually all passenger cars will be equipped with the same type of equipment, as for example that providing for both straight air and automatic control. But until such a time arrives it will be evident that the brake control equipment provided on locomotives should, in the interest of efficiency, be arranged to control the brakes of either of these car equipments. This, however, presents a problem which involves many practical difficulties.

In high speed trains comprising cars equipped with combined straight air and automatic equipments, service applications of the brakes are normally effected by straight air operation, with the straight air and automatic portions so interlocked that should the straight air service application not materialize as intended the automatic portion will be promptly operated to produce an emergency application. In addition, provision is made for effecting service applications by operation of the automatic portion, so that in the event that the straight air portion should fail, or become inoperative, service applications can still be effected. With the inclusion of the safety and auxiliary features before referred to, the control for high speed trains alone necessitates an arrangement of interlocked and interrelated devices involving considerable complexity.

In the control of trains comprising cars equipped with either "UC" equipment or "AB" equipment, provision has heretofore been made for control of the locomotive brakes independently of control of the train brakes. This feature has not been considered desirable or necessary for the special locomotives provided in connection with ultra high speed trains.

Now in order that the differently equipped cars may be used with the utmost regard for efficiency, it will be apparent that at times trains will be made up comprising either all cars equipped with one type of brake equipment, or with some cars equipped with one type of brake equipment and other cars equipped with another type of brake equipment, and in extreme cases all four of the brake equipments above referred to may be present in one train. In any case the control equipment on the locomotive should be capable of properly controlling the brakes throughout either type of train with the same degree of safety and flexibility.

It is accordingly a general object of the present invention to provide an improved locomotive brake control equipment which may be operable to control the brakes throughout a train regardless of which of the above enumerated types of brake equipments is supplied on the individual cars.

A further object of the invention is to provide an improved locomotive equipment which is arranged to control the brakes throughout a train by either straight air operation or by automatic operation, or by a combination of the two, and which at the same time provides for control of the brakes on the locomotive independently of control of the brakes on the train.

A yet further object of the invention is to provide a brake equipment of the character before indicated, with the addition thereto of a number of safety and interlock features designed to insure with all reasonable certainty that an application of the brakes will be fully effected when once initiated.

Yet another object of the invention is to provide a locomotive brake equipment of the character indicated, which provides for flexible control of both the locomotive and car brakes, in harmony with each other, and of the locomotive brakes independently of the car brakes.

Other objects and advantages of the invention, dealing particularly with the arrangement and construction of parts for generally carrying out the above stated objects and to provide features to be hereinafter stated, will be best understood from the following description of an embodiment of the invention, which is illustrated in the attached drawings.

In the accompanying drawings:

Figs. 1 and 1A, when taken together and placed end to end, represent a diagrammatic view, mainly in section, of a locomotive brake equipment embodying the invention;

Fig. 2 is a vertical, sectional view of the independent brake valve device shown in outline in Fig. 1;

Fig. 3 is a sectional view taken on the line 3—3 in Fig. 2;

Fig. 4 is a partial, side elevational view of the independent brake valve device shown in Fig. 2 and looking in the direction of the arrow 4;

Fig. 5 shows in diagrammatic form the development of three cams employed in the brake valve device shown in Fig. 2, these cams being arranged in projected relation to the various operating positions of said device;

Fig. 6 is a sectional view of a double heading cock showing the valve in a different position than shown in Fig. 1; and Fig. 7 is a sectional view of a removable cut out cap.

As shown in the drawings, the locomotive brake equipment comprises an automatic brake valve device 1, an independent brake valve device 2, a master switch device 3 and an application and release magnet valve device 4 controlled by said switch, a control valve device 5, a relay valve device 6, an emergency brake pipe vent valve device 7, a cut-off valve device 8, an interlock valve device 9, and a suppression selector valve device 10. The equipment further comprises a straight air pipe 11 and a brake pipe 12 both of which are adapted to be connected through the train, application and release train wires 13 and 14 respectively, a main reservoir 15 adapted to be supplied with fluid under pressure in any well known manner, a feed valve device 16 operative to supply fluid from said reservoir to a feed valve pipe 17 at a pressure which it is desired to be carried in the brake pipe 12, and a brake cylinder 18 for applying the brakes on the locomotive.

The automatic brake valve device 1 which is provided for concurrently controlling the brakes on the locomotive and cars of a train is substantially the same as that disclosed in Patent No. 2,106,483, issued to Ellis E. Hewitt on January 25, 1938. A detailed description of the intricate construction and operation of this device is however not essential to a clear understanding of the invention, and it is therefore elected to describe only those functions of the device which are essential to an understanding of the operation of the equipment illustrated.

The automatic brake valve device 1 is provided with means for controlling the brakes on the locomotive and cars of a train by straight air through the straight air pipe 11, and other means for controlling the locomotive and car brakes on the automatic principle through the medium of the brake pipe 12. A selector 18' is provided on the side of the brake valve device for selecting either the straight air or automatic control means therein which it is desired to employ for controlling the locomotive and train brakes, while a brake valve handle 19, preferably of the safety control type, is provided for operating the selected control means.

The selector 18' is preferably provided with proper legends which indicate the straight air and automatic adjusted positions thereof. When in the straight air position and the handle 19 is in release position, a straight air control pipe 20 is connected to the atmosphere and therefore vented, while the brake pipe 12 is maintained charged with fluid at the pressure supplied by the feed valve device 16 by way of pipe 17, a brake pipe branch pipe 21 and the vent valve device 7. When the selector 18' is in this position an application of the brakes is effected by moving the handle 19 to any desired position in an application zone, whereupon the control pipe 20 is disconnected from the atmosphere and fluid is supplied from the feed valve pipe 17 to said control pipe to a degree dependent upon the extent of movement of said handle into said zone. A release of the brakes is effected when the selector is in the straight air position by moving the handle 19 back toward release position and thereby reducing the pressure in control pipe 20 a degree depending upon the extent of such movement. During the operation of the handle 19 in the application zone with the selector 18' in the straight air position communication is maintained between the feed valve device 16 and brake pipe 12 so as to maintain said brake pipe charged.

When the selector 18' is in the automatic position, the handle 19 is then movable on a quadrant which may have the usual automatic control positions, namely release, running, first service, lap and service, and the control means in the brake valve device is conditioned to respond to the operation of said handle to either charge the brake pipe 12 with fluid under pressure, to effect a service reduction in brake pipe pressure or to lap the brake pipe in the usual well known manner. When the selector is in the automatic position the straight air control pipe 20 is open to the atmosphere.

The brake valve handle 19 has an emergency position and regardless of the position of the selector 18', said handle is operative upon movement to said position to vent the brake pipe 12 directly to the atmosphere, by way of a branch pipe 22, for effecting an emergency application of brakes.

A safety control pipe 23 is connected to the automatic brake valve device 1 and, as hereinbefore mentioned, the handle 19 is of the safety control type and is adapted upon release of manual pressure to open said pipe to the atmosphere for effecting an emergency application of the brakes. Thus the safety control handle 19 must be maintained in a depressed condition except under certain conditions which will be hereinafter set forth.

The independent brake valve device 2 is provided for controlling the brakes on the locomotive independently of the brakes on the cars in the train, and comprises a casing in which there is disposed a spindle 24 which is operative by a handle 25 for controlling the operation of a self-lapping application and release valve mechanism 26, a cut-off valve 27, and an application delay valve 28, while a lock out valve mechanism 29 is provided in said casing for control by said handle in all positions thereof, independently of movement of said spindle.

The spindle 24 extends through a chamber 30 in the brake valve device with the lower end journalled in a suitable bore in the casing, while the upper end extends through a central aperture in a bushing 31 secured in the casing. A sealing, ring-like washer 32 is interposed between the end of the bushing 31 and an annular collar 33 on the spindle 24 for preventing leakage of fluid under pressure from chamber 30, while a spring 34 is provided to act on the lower end of said spindle to urge the collar 33 and the end of the bushing 31 into sealing contact with said washer.

A sleeve 35 having thereon a cam surface 36, shown in developed form in Fig. 5 of the drawings, is disposed within the bushing 31 over the end of spindle 24 and is secured in any suitable manner to said spindle so as to rotate therewith. The lower end of the sleeve 35 is provided with an annular bearing collar 37 engaging an oppositely disposed similar collar on the bushing 31. An actuating sleeve 38 is fitted over the sleeve 35 with the lower end in engagement with the collar 37 of the sleeve 35 and having a free turning fit in the bushing 31 above said collar. The sleeves 38 and 35 are secured together by a pin 39 and the portion of sleeve 38 over the cam surface 36 on sleeve 35 is cut away.

A removable handle guard 40 is secured to the top of the brake valve casing over the upper end of the sleeve 38 and is provided with a bushing 41 having a bore in which the upper end of the sleeve 38 is journaled.

The sleeve 38 is provided with two oppositely disposed slots 42 in which the inner end portion of the brake valve handle 25 is mounted to slide in a vertical direction. The inner end of the handle 25 is provided with an opening 43 through which there extends a fulcrum pin 44 secured at opposite ends in spaced ears 45 projecting from the sleeve 38, one at either side of the innermost slot 42. A roller 46 is carried on the pin 44 within the opening 43 in the handle 25 for engagement by the lower wall of said opening.

A plunger 47 is slidably mounted in an axial bore in sleeve 38 below the handle 25. The upper end of this plunger is closed and a circular recess is provided in the outer face of the closure in which there is disposed a roller 48 which is disposed in a suitable slot in the handle 25 and is rotatably mounted on a pin 49 extending through the side walls of such slot. A spring 50 contained within the plunger 47 is interposed between the closed end thereof and the upper end of sleeve 35 for urging said plunger outwardly of the sleeve 38 and thereby turning said handle about the roller 46 as a fulcrum to its normal raised position, as shown in the drawings. The handle 25 is adapted to be moved downwardly by manual pressure against the resistance of spring 50, and it will be noted that during any vertical movement of said handle the roller 48 is maintained in engagement with the recess in the plunger 47 since the opening 43 in the inner end is sufficiently larger than the roller 46 to permit this end of the handle to move back and forth relative to the roller 46.

The plunger 47 is provided with two oppositely disposed longitudinally extending slots into which extend two pins 51 which are secured in the sleeve 38 and which are adapted to engage the lower ends of said slots to limit outward movement of the plunger 47 before the handle 25 is applied to or after it is removed from the brake valve device in the process of assembling or disassembling said device.

The brake valve handle 25 is provided with a locking position to the extreme left, a release position to the immediate right thereof in which the handle is normally carried, and an application and release zone extending toward the right hand from the release position, as indicated in Figs. 3 and 5 of the drawings.

The cam 36 is provided on the sleeve 35 for effecting unseating of the application delay valve 28 upon movement of the handle 25 out of release position into the application and release zone. This delay valve is contained in a chamber 52 which is connected to a pipe 53 and which also contains a spring 54 acting on said valve for urging it into sealing engagement with a seat rib 55, which surrounds a passage 56 leading to a chamber 57 which in turn is open to the atmosphere through any suitable passage such as 58. The valve 28 is provided with a fluted stem 59 extending through passage 56 and chamber 57 and through suitably aligned openings in the casing and bushing 31 and with the end disposed in operative alignment with the cam surface 36, whereby upon movement of the handle 25 out of release position into the application and release zone, the surface 36 will move into engagement with said stem and then unseat the valve 28 and maintain same unseated until the handle is returned to the release position.

The self-lapping application and release valve mechanism 26 is secured as a unit to the brake valve casing over an opening in one side of chamber 30. This mechanism comprises an application valve 60 for controlling communication between chamber 30 and a passage 61 which is connected to the feed valve pipe 17. The valve 60 is carried by a piston 62 which is slidably mounted in a suitable bore in the casing and which contains a spring 63 acting thereon for urging the valve 60 to its seated position. A port 64 is provided through the head of piston 62 for equalizing the fluid pressures on the opposite faces thereof.

A lapping piston 65 is slidably mounted in a suitable bore in the casing and is open at one side to chamber 30 and at the opposite side to a chamber 66 which is in permanent communication with the atmosphere through a passage 67 and which contains an adjustable control spring 68 acting on the piston 65 for urging it in a direction toward the left hand.

The piston 65 is provided on the left hand face with a packing cup 69 arranged to prevent leakage of fluid under pressure from chamber 30 to chamber 66, while projecting from the right hand face is a stem 70 which is slidably mounted in a suitable axial bore provided through an adjusting nut 71 for the spring 68.

The piston 65 is provided axially with a chamber 72 open to chamber 30 and containing a release valve 73 for controlling communication between chamber 72 and a chamber 74 which is open through a plurality of passages 75 to chamber 66 and thence to the atmosphere through passage 67.

The release valve 73 is provided with a stem the outer end of which slidably extends through a suitable opening in an element 76 secured to the left hand face of the piston 65. An annular collar 77 is provided on the release valve stem at the right hand side of element 76 for engagement therewith to limit unseating movement of the release valve, and a spring 78 is provided in said piston and acts on said collar for urging said valve to this open position. A guide pin 79 projects from the right hand side of the release valve 73 and is slidably mounted in a suitable bore in the piston stem 70.

A plunger 80 is provided with one end slidably mounted in a suitable bore in the casing arranged parallel to and intermediate of the axes of the application valve 60 and release valve 73, and with the outer end disposed in operative alignment with a cam 81 carried by the brake valve spindle. A rocking beam 82 is pivotally connected intermediate its ends to the plunger 80. In one end of this beam there is provided a roller 83 adapted to engage the end of the release valve stem, while pivotally connected to the other end is one end of a pin 84, the other end of which engages the application valve 60 within a suitable axial recess.

The cam 81 is arranged to urge the plunger 80 outwardly, that is toward the right hand, upon movement of the handle from release position into the application and release zone and to permit the return of said plunger to the position shown in the drawings upon the return of said handle to release position, the degree of movement of said plunger from the position shown in the drawings depending upon the distance the handle is moved from release position. The operating surface of the cam 81 is of constant radius between the release and locking positions of the handle so that upon movement between these positions the plunger 80 will remain stationary.

A cam 300 is associated with the cam 81 for controlling the operation of the cut-off valve 27 which is contained in a chamber 301 connected to a pipe 302 and which is provided with a fluted stem 303 slidably mounted in a suitable bore connecting chamber 301 to chamber 30 and extending into chamber 30 into operative alignment with the cam 300. A spring 304 in chamber 301 acts on the valve 27 for urging it to its seat. The cam 300 is so designed as to permit seating of the valve 27 in the locking position of handle 25, but to effect unseating of said valve upon movement of said handle to release position and to maintain said valve unseated in the application and release zone, as will be clear from an inspection of Fig. 5 of the drawings.

The lock out valve mechanism 29 comprises two oppositely seating valves 87 and 88 disposed in chambers 89 and 90 and provided with oppositely extending fluted stems, respectively, which engage each other in an intermediate chamber 91. The chamber 89 is connected to the feed valve pipe 17 and contains a spring 92 for seating the valve 87 and at the same time unseating the valve 88. The chamber 90 is open to the atmosphere through a passage 93, and the intermediate chamber 91 is connected to a pipe 94.

The brake valve casing is provided with a vertical bore in axial alignment with the valve 88 and open at one end to chamber 90 and at the opposite end to the top surface of the brake valve casing. This bore is lined with a bushing in which there is slidably mounted a sleeve 95, the upper end of which is interiorly threaded to receive the threaded portion of a smaller sleeve 96 disposed within the sleeve 95. The lower end of the sleeve 95 is partially closed to provide a shoulder for supporting a movable spring seat 97, and extending through the unclosed end portion of said sleeve into engagement with the lower face of said seat is an extended portion of the valve 88. A spring 98 is interposed between the opposite face of the seat 97 and a disc 99 slidably mounted within said sleeve and normally engaging the lower end of the inner sleeve 96. A spring 100 is disposed within the inner sleeve 96 with one end engaging the disc 99 and the opposite end engaging one face of a movable seat member 101. An annular shoulder is provided at the outer end of the inner sleeve 96 for engagement by the seat member 101 to limit outward movement thereof, and said seat member is provided with an axial stem 102 projecting beyond the outer end of said sleeve. The spring 100 is somewhat weaker than spring 98 in their extended conditions shown in the drawings, for reasons which will be hereinafter described.

A substantially semicircular bail 103, disposed between the handle 25 and stem 102, is pivotally mounted at opposite ends on a shaft 104 suitably secured in the handle guard 40, the bail being so arranged that movement of the handle 25 to its various positions is over a portion of the bail intermediate the fulcrumed ends thereof.

The bail 103 has a lip 105 engaging the end of the stem 102 and is adapted to be operated by the handle 25 in any position thereof to move said stem in a downwardly direction. This operation of the handle 25 is accomplished by the application of manual pressure sufficient to overcome the opposing pressure of spring 50 acting on the plunger 47. Normally, however, the spring 50 is adapted to hold the handle 25 in a raised position out of contact with the bail 103.

The guard 40 is provided in one side with an opening 106 extending circumferentially thereof in which the brake valve handle 25 is adapted to move upon movement to its different positions, the length of this opening being sufficient to permit such movement.

The upper edge of this opening, against which the handle 25 is forced into engagement by spring 50, is however formed at three different levels, there being a portion 107 and to the left thereof two successive steps 108 and 109, the step 108 being at a level intermediate the step 109 and portion 107. The portion 108 is coextensive with the application and release zone into which the handle is movable, while the step 109 defines the locking position of the handle.

The edge portion 107 is of such length as to permit the handle 25 to be held in its raised position by spring 50 in the release position thereof and during its movement through the application and release zone. In order to move the handle to the left from release position to the locking position defined by step 109, it must be depressed a certain amount in order to move in under the step 108, and then it must be further depressed in order to move it past the step 108 and in under the step 109. It will be noted that upon relief of manual pressure on the handle, the spring 50 will urge the handle into engagement with either of the steps 108 and 109 which are made concave to receive said handle and thus prevent said handle slipping out of the position to which it is manually moved.

The steps 108 and 109 are provided to ensure that upon movement of handle 25 from release to locking position, the cam 300 will turn far enough to permit closing of the cut-off valve 27 before the lock out valve 88 is seated and the oppositely disposed valve 87 is unseated. The parts are so arranged that when the handle 25 obtains the position in alignment with the step 108 the cut-off valve 27 will be seated. The depression of the handle required to permit movement thereof under the step 108 moves the stem 102 downwardly until the bail 103 is moved substantially into engagement with the end of the sleeve 96, and this movement of said stem compresses the relatively light spring 100 but the consequent increase in force of this spring is not sufficient to shift the valves 88 and 87 from the positions shown in the drawings against the opposing pressure of spring 92. However, when the handle 25 is moved from beneath the step 108 to beneath the step 109, i. e. to the locking position, the depression of the handle required to permit such movement moves bail 103 into engagement with the end of sleeve 96 and then moves said sleeve, the sleeve 95 and the disc 99 in a downwardly direction. The spring 98 is stronger than spring 92 so that the downward movement of disc 99 acts through spring 98 to seat the valve 88 and unseat the valve 87. After the valve 88 is thus seated, any further downward movement of the bail 103 and sleeves 95 and 96 is taken up by compression of spring 98.

When the handle 25 is moved back to the release position where its upward movement is limited by the edge portion 107 of the opening 40, it will be evident that the spring 92 will again seat valve 87 and unseat the valve 88. It will however be noted that in any position of the handle 25 it may be operated to seat the valve 88 and unseat the valve 87, but only in the locking position will these valves be held in these positions upon the relief of manual pressure on the handle.

The master switch device 3, which is provided for controlling the energization and deenergization of the application and release train wires 13 and 14, comprises a casing containing two spaced flexible diaphragms 305 and 306 operatively connected together by a stem 307. The diaphragm 305 has at its outer face a chamber 308 connected to pipe 110, while the diaphragm 306 has at its outer face a chamber 111 connected to the straight air pipe 11 through a choke 112 and by way of a check valve device 113. A chamber 114 is formed intermediate the diaphragms 305 and 306 and secured to but insulated from the stem 307 in this chamber is a movable contact 115 to which is connected one terminal of an electric supply such as a battery 116, the other terminal of which is grounded. Two flexible contacts or fingers 117 and 118 carried by and insulated from the casing in any suitable manner project into the chamber 114 and are arranged to be successively engaged by the movable contact 115 upon movement thereof toward the right hand, and disengaged in the reverse order upon movement of the contact 115 toward the left hand. The contacts 117 and 118 are respectively connected to the release train wire 14 and application train wire 13.

The application and release magnet valve device 4 comprises an application magnet 119 having one terminal connected to the application train wire 13 and the other to ground, and a release magnet 120 having one terminal connected to the release train wire 14 and the other to ground.

The application magnet 119 is provided for unseating an application valve 121 upon energization of the magnet so as to supply fluid under pressure from a pipe 122, which is connected to an auxiliary reservoir 123, to a branch pipe 124 of the straight air pipe 11. A spring 125 is provided which acts on the application valve 121 to seat same upon deenergization of the magnet 119 for thus cutting off the supply of fluid under pressure to the straight air pipe.

The release magnet 120 is provided for seating a release valve 126 upon energization of the magnet so as to close communication between the straight air pipe branch pipe 124 and an atmospheric release port 127. A spring 128 acting on the valve 126 is provided for unseating said valve to open the release communication upon deenergization of the magnet 120.

The control valve device 5 comprises a pipe bracket 129, an emergency valve device 130 secured to one face of said bracket and a triple valve device 131, which are preferably the same or similar in function and construction to the control valve device developed for use on passenger cars and disclosed in the forementioned Hewitt and McNeal copending application, Serial No. 160,562. However, in the present illustrative embodiment only those parts are shown which are deemed essential to a comprehensive understanding of the invention.

A filling piece 132 is interposed between the pipe bracket 129 and triple valve device 131 and is carried by said pipe bracket and in turn carries said triple valve device and is provided with passages required to connect passages in the triple valve device with corresponding passages in the bracket. This filling piece and devices associated therewith are provided to adapt the pipe bracket 129, emergency valve device 130 and triple valve device 131 for a locomotive equipment, as will be hereinafter described.

The triple valve device 131 comprises a piston 133 having at one side a chamber 134 connected to the brake pipe 12 through passages 135 and 136 and having at the opposite side a valve chamber 137 connected by a passage 138 to pipe 122 leading to the auxiliary reservoir 123. Disposed in the valve chamber 137 is a main slide valve 139 and an auxiliary slide valve 140 adapted to be controlled by said piston in the usual manner.

The parts of the triple valve device have a release position, shown in the drawings, which they assume when the brake pipe 12 is charged and in which a feed groove 141 is connected to the chamber 134 so that fluid under pressure supplied from the brake pipe 12 to said chamber may flow to valve chamber 137 and from thence to the auxiliary reservoir 123 for charging same. Also in this position, a passage 142 is connected to the piston chamber 134 so that fluid under pressure may flow therefrom and charge an emergency reservoir 143 by way of two serially arranged check valves 144 and passage and pipe 145. In the release position of the main slide valve 139, a cavity 146 therein connects a passage 147 to an atmospheric port 148 and through this communication the release of brakes after an automatic application is adapted to be effected.

The triple valve piston 133 is adapted to respond to a reduction in pressure in the brake pipe 12 and piston chamber 134 at a service or emergency rate and move the slide valves 139 and 140 to an application position in which a service port 149 in the main slide valve 139 is uncovered by the auxiliary slide valve 140 and registers with passage 147 through which communication fluid under pressure is adapted to be supplied from the auxiliary reservoir 123 to passage 147 for effecting an application of the brakes.

The emergency valve device 130 comprises a piston 150 having at one side a chamber 151 connected to the brake pipe 12 through passages 135 and 136 and having at the opposite side a valve chamber 152 connected to a quick action chamber 153 and containing a main slide valve 154 and an auxiliary slide valve 155 adapted to be operated by said piston.

The parts of the emergency valve device are shown in their usual release position assumed when the brake pipe is charged. In this position a restricted port 156 is open to the piston chamber 151 and through this port fluid supplied from the brake pipe to chamber 151 is adapted to flow to and charge the valve chamber 152 and quick action chamber 153.

Upon a service reduction in pressure in the brake pipe 12 and piston chamber 151 the piston 150, and thereby the auxiliary slide valve 155, are adapted to move toward the right hand relative to the main slide valve 154 until a port 157 in the main slide valve is opened to the valve chamber 152 sufficiently to permit the pressure of fluid therein and in the connected quick action chamber 153 to reduce by flow through said port, and a connected restricted atmospheric passage 158 in the seat of the main slide valve, at substantially the same rate as the rate of reduction in brake pipe pressure so as to prevent further movement of the piston upon a service reduction in brake pipe pressure.

The restriction in the atmospheric passage 158 is such, however, that the pressure of fluid in valve chamber 152 cannot reduce as rapidly as that in chamber 151 upon an emergency reduction in brake pipe pressure, in which case a sufficient differential of pressures will be obtained on the piston 150 to move the main slide valve 154 to its emergency position in which the passage 158 will be connected past the end of said slide valve to valve chamber 152 to permit release of the fluid under pressure in valve chamber 152 in order to facilitate movement of the parts back to their release position upon a subsequent increase in pressure in brake pipe 12.

In the release position of the main emergency slide valve, a cavity 159 therein connects an emergency straight air control pipe 160 to an atmospheric passage 161, while in emergency position the passage 161 is lapped and the cavity 159 connects the emergency reservoir passage 145 to the pipe 160 and also to the automatic application passage 147.

The filler piece 132 carries on one face an interlock valve device 165 for interlocking the automatic and straight air controls of the brake system for the locomotive and cars of a train and the independent control of the brake system on the locomotive, and carries on another face an emergency application delay valve device 166.

The interlock valve device 165 comprises two double check valves 167 and 168 of usual construction, a selector valve device 169 and an independent release valve 170.

The double check valve 167 is in the form of a movable piston arranged to control communication between a brake application and release passage 171 and either a passage 172 opening to one end of said check valve or a passage 173 opening at the opposite end. In the position shown in the drawings the passage 171 is disconnected from passage 173 and connected to passage 172. Upon movement of the check valve 167 to its upper position passage 171 is disconnected from passage 172 and connected to passage 173.

The double check valve 168 is like check valve 167 and is provided to control communication between passage 172 and either a straight air passage 174 at one end or an independent application and release control passage 175 at the opposite end.

The selector valve device 169 comprises a piston 176 having at one side a chamber 177 connected to a passage 178 leading to pipe 94 and having at the opposite side a valve chamber 179 in permanent communication with and thus at all times charged with fluid under pressure from the feed valve pipe 17, by way of passage 309.

The piston 176 is provided for controlling movement of a slide valve 180 disposed in chamber 179 and operatively connected to said piston. A spring 181 in chamber 177 acts on the piston 176 for urging it from its normal position shown in the drawings to an independent control position defined by engagement of said piston with a shoulder 182 in the casing.

The positioning of the piston 176 and slide valve 180 is controlled by the lock out valve mechanism in the independent brake valve device 2. When the independent brake valve handle 25 is in its normal raised position the selector valve piston chamber 177 is vented through passage 178, pipe 94 and past the lock out valve 8, which permits the feed valve pressure in valve chamber 179 to hold the selector piston 176 and slide valve 180 in the position shown in the drawings. When the handle 25 is depressed the valve 88 is seated and the lock out valve 87 is opened and supplies fluid under pressure from the feed valve pipe 17 to pipe 94 and from thence to the selector piston chamber 177 where, upon substantial equalization of fluid pressures on the piston 176, the spring 181 shifts said piston and the slide valve 180 to the independent control position.

The selector slide valve 180 is provided with a cavity 184 which in the normal position thereof establishes communication between a passage 185 connected to the straight air pipe 11 and the passage 174 through which straight air application and release of the locomotive brakes is effected. In the upper or independent control position of the slide valve 180 this communication is broken and cavity 184 connects a passage 186 to the independent control passage 175 for controlling the operation of the independent release valve 170.

The independent release valve 170 is provided for controlling communication between passage 171 and a local atmospheric vent passage 187 and is provided on one side with a gasket adapted to engage a seat rib 188 for closing said communication, and has at the opposite side a chamber 189 connected to passage 186 and containing a spring 190 for urging the valve to the closed position shown in the drawings.

A check valve 191 is disposed in passage 186 to prevent flow of fluid under pressure in the direction from chamber 189 to the selector slide valve 180. A restricted port 192 is provided through the independent release valve 170 connecting chamber 189 to passage 171 for permitting equalization into said chamber of the fluid pressure in said passage acting on the opposite face of said valve, so that the spring 190 will be enabled to hold the valve 170 in the position closing communication between passage 171 and the vent port 187.

The emergency application delay valve device 166 comprises a flexible diaphragm 193 having at one side a chamber 194 and at the opposite side a chamber 195. A valve 196 disposed in chamber 195 is secured to the diaphragm 193 for movement therewith and is adapted to cooperate with an annular seat rib 197 for controlling a communication between the automatic application passage 147 and the passage 173.

A relatively restricted flow passage 198 connecting passages 147 and 173 and a relatively unrestricted passage 199 containing a check valve 200 also connecting said passages are provided for permitting flow of fluid under pressure from one passage to the other when the valve 196 is seated. The check valve 200 is arranged to prevent flow of fluid in the direction from passage 147 to passage 173 so that the choked passage 198 will control such flow, but to permit a more rapid flow in the opposite direction.

The diaphragm chamber 194 is connected by a passage 201 to pipe 53 leading to the delay control valve 28 in the independent brake valve device. Adjacent the independent brake valve device, the pipe 53 is connected to the feed valve pipe 17 through a cock 202 which comprises a plug valve 203 having a port 204 and a handle 205 for turning said valve from a closed position shown in the drawings to an open position in which the port 204 establishes a communication between pipes 17 and 53, through a choke 206. The plug valve 204 is normally carried in the closed position shown in the drawings, and as a consequence the pipe 53 and thereby the diaphragm chamber 194 will be vented upon the initial unseating of the delay valve 28 in the independent brake valve device, so that the delay valve device 166 will normally be ineffective.

The relay valve device 6 may be of any well known type adapted to operate upon fluid under pressure being supplied to a pipe 207, which is connected to passage 171 in the control valve device 5, to supply fluid under pressure from the main reservoir 15 and a main reservoir pipe 208 to a pipe 209 and from thence to the brake cylinder 18 for applying the brakes on the locomotive. Upon the release of fluid under pressure from pipe 207, the relay valve device 6 is adapted to operate to release fluid under pressure from the brake cylinder 18. In other words, the relay valve device 6 is operative to vary the pressure in brake cylinder 18 in accordance with variations in the pilot or control pressure in pipe 207, in the usual manner.

The vent valve device 7 comprises two spaced pistons 211 and 212, the smaller piston 212 being provided in its outer face with a valve 213 for controlling communication between a chamber at the outer face of said piston and an atmospheric exhaust port 214. A chamber 215 is provided at the outer face of the larger piston 211 and is connected to a safety control pipe 216, a spring 217 being provided in said chamber for urging the pistons to the position for seating valve 213. A restricted port 219 is provided through piston 211 connecting chamber 215 to an intermediate chamber 220 through which the pressures in said chambers normally equalize, but this port is sufficiently restricted that upon venting fluid under pressure from chamber 215, a differential of fluid pressures will be established on the piston 211 which will move both pistons upwardly against the spring 217 to an emergency position defined by engagement of piston 211 with a gasket 221 and in which the valve 213 is opened. In the normal position of pistons 211 and 212, the chamber 220 establishes communication through the pipe 21 from the brake valve device 1 to the brake pipe 12, but in the upper position thereof this communication is closed and the brake pipe 12 is connected to the exhaust port 213 through which an emergency reduction in brake pipe pressure is adapted to be effected.

The cut off valve 8 is provided for controlling communication between the safety control pipe 216 connected to the vent valve device 7 and pipe 23 connected to the brake valve device 1 and comprises in a casing two spaced, operatively connected flexible diaphragms 222 and 223, the diaphragm 222 being of smaller diameter than the diaphragm 223.

The diaphragm 222 is normally spaced from a seat 224 in the casing for establishing communication between pipes 216 and 23 but is adapted to be moved into engagement with said seat for closing said communication upon the supply of fluid under pressure to a chamber 225 formed at the outer face of the larger diaphragm 223.

The chamber 225 is normally open to the atmosphere through a port 226 which is controlled by a valve piston 227 and opened when said valve piston is in the normal seated position shown in the drawings. This valve piston is subject on one face to the pressure of a spring 228 urging it to its normal seated position, and on the opposite face is subject to the pressure of fluid in a pipe 229. When the pressure of fluid in pipe 229 is built up to a predetermined degree, its action on the valve piston 227 is adapted to move said valve piston from the position shown in the drawings to an upper position for closing communication from chamber 205 to port 226 and for connecting pipe 229 to said chamber whereupon fluid under pressure is adapted to be supplied to said chamber to act on the diaphragm 223 for moving the diaphragm 222 into engagement with seat 224. When the pressure of fluid in pipe 229 is reduced to a predetermined degree, the valve piston 226 is adapted to be returned to the position shown in the drawings for thereby venting the chamber 225 whereupon the diaphragm 222 will be moved out of engagement with seat 224.

The interlock valve device 9 comprises a casing containing two spaced flexible diaphragms 230 and 231. The diaphragm 230 is of smaller area than diaphragm 231 and has at its outer face a chamber 232 connected to a pipe 233 to which is connected a timing reservoir 234, while the diaphragm 231 has at its outer face a chamber 235 which is connected to a pipe 236 and which contains a spring 237 acting on the diaphragm.

The diaphragms 230 and 231 are operatively connected together by a yoke 238 which is provided for controlling a vent valve 239 slidably mounted in a suitable bore in the casing and provided for controlling communication between a passage 240 connected to the safety control pipe 216 and a vent port 241 which is open to the atmosphere through chamber 242 formed intermediate the diaphragms 230 and 231 and a passage 243 leading to the atmosphere.

The vent valve has a stem telescopically connected to the stem of a plunger 244 by means of a pin and slot connection 245, and a spring 246 is interposed between said valve and plunger for normally urging same apart. The plunger 244 is engaged by an extension at one end of yoke 238 and is operative thereby upon movement of said yoke toward the left hand to seat the valve 239, while upon movement toward the right hand, the valve is relieved of seating pressure to permit same to be opened by pressure of fluid from the safety control pipe 216.

The suppression selector valve device 10 comprises in a casing a piston 247 and two oppositely seating poppet valves 248 and 249 contained in a chamber 250 and adapted to be controlled by said piston.

The valve 248 is provided for closing communication between chamber 250 and a chamber 251 which is connected to pipe 207 leading to the relay valve device 6, while the valve 249 is provided for controlling communication between chamber 250 and a chamber 252 which is open to the atmosphere through a vent passage 253.

The valve 248 has a fluted stem extending into chamber 251 where it is subjected to the pressure of a spring 254 adapted to urge said valve to the unseated position and the valve 249 to the seated position shown in the drawings.

The piston 247 has at one side a chamber 256 connected to pipe 160 leading to the emergency valve device 130 and has at the opposite side a chamber 257. A hollow stem projects from the piston through chamber 257 and a suitable bore in the casing leading to chamber 252 and disposed in said stem is a plunger 258 in operative alignment with the fluted stem 255 of the valve 249. A spring 259 is interposed between the piston and plunger 258.

In the position of the piston 247 shown in the drawings, the spring 254 unseats the valve 248 and seats the valve 249, but upon the supply of fluid under pressure to chamber 256, the piston 247 is adapted to operate to unseat valve 249 and seat valve 248 and then due to spring 259 move relative to said valves into sealing engagement with a gasket 260. The parts of this device however remain in the position shown except in case of an automatic emergency application of the brakes when fluid under pressure is supplied to chamber 256.

In Fig. 1 of the drawings there are shown in elevation three double check valve devices 261, 262 and 263, the construction and operation of all of which are identical and well known and similar to that of the double check valves 167 and 168 shown in the control valve device 5.

The straight air pipe 11, brake pipe 12 and the application and release wires 13 and 14 are adapted to extend to both ends of the locomotive for connection with corresponding pipes and wires on vehicles which will be connected to the locomotive. The pipes 302 and 94 are also adapted to extend to both ends of the locomotive for connection however only with corresponding pipes on another locomotive for use in double heading, to control the brakes on the second or non-control locomotive from the leading locomotive. In the drawings, the train wires 13 and 14 and pipes 302 and 94 are broken off short of the left hand end of the equipment merely to avoid undue complexity of the illustration.

OPERATION

Charging of the equipment

At all times when the locomotive is running with the brakes released, the handle 19 of the automatic and straight air brake valve device 1 will be held in release position and depressed. The service control pipe 20 will thus be maintained open to the atmosphere, while the brake pipe 12 will be maintained charged to the desired pressure from the feed valve device 16 through chamber 220 in the vent valve device 7. The cut-off valve 222 will be open, thus connecting the safety control pipe 216 to pipe 23 which is closed in the brake valve device by depressing of handle 19, and these pipes and chamber 215 in the vent valve device will be maintained charged by way of the small port 219 in the vent valve piston 211.

With the service control pipe 20 vented, the parts of the master switch device 3 will be in the position shown in which both the application and release train wires 13 and 14 and therefore the application and release magnet valve devices 119 and 120, respectively, will be deenergized. The straight air pipe 11 will then be vented past the release valve 126 in the release magnet valve device 120 to the atmosphere.

The auxiliary reservoir 123 will be charged from the brake pipe 12 through the feed groove 141 and the emergency reservoir 143 will be charged from the brake pipe by way of passage 142 and past the check valves 144. In the emergency valve device, the valve chamber 152 and quick action chamber 153 will be charged from the brake pipe through the small feed port 156. The parts will then be in the position shown in the drawings.

The handle 25 of the independent brake valve device 2 will normally be in its release and elevated position, in which case pipe 94 and thereby piston chamber 177 of the selector valve device 169 are vented so that the parts of said device will be in the position shown. Pipe 302 is vented through the independent brake valve device 2 in release position thereof so that the chamber at the lower face of the double check valve 168 will be vented. The chamber at the lower face of the double check valve 167 is vented through cavity 146 in the triple valve device 131 in its release position. As a result, pipe 207 through which fluid under pressure is adapted to be supplied to and released from the relay valve device 6 is connected past the upper end of first the double check valve 167 to passage 172 and then past the double check valve 168 to passage 174 and thence through cavity 184 in the selector slide valve 180 to passage 185 and thence to the vented straight air pipe 11. The relay valve device 6 is thus conditioned to vent the brake cylinder 18 so that the brakes on the locomotive will be released.

The emergency application delay cock 202 is normally carried in the closed position shown so that the emergency delay valve device 166 will be ineffective.

*Electro-pneumatic straight air application of train brakes*

If the locomotive is to be employed for controlling the brakes on a train equipped with a straight air pipe, a brake pipe and, application and release train wires to be connected to those on the locomotive, the selector 18' on the brake valve device 1 is turned to the straight air position. Then in order to effect an application of the train brakes, the brake valve handle 19 is turned into the application zone and operates to supply fluid under pressure to the service control pipe 20 to a degree depending upon the extent of movement from the release position.

The fluid under pressure supplied to the service control pipe 20 flows to chamber 308 in the master switch device 3 and effects movement of the diaphragms 305 and 306 and thereby the contact 115 toward the right hand into engagement with fingers 117 and 118 thereby supplying electric current from the battery 116 first to the release train wire 14 and then the application train wire 13. The release magnet 120 on the locomotive is consequently energized and seats valve 126 to close communication between the straight air pipe 11 and atmospheric exhaust port 127, following which the application magnet 119 is energized and acts to open the valve 121.

With valve 121 unseated, fluid under pressure flows from the auxiliary reservoir 123 to the straight air pipe 11 and from thence through the choked passage 112 into diaphragm chamber 111 in the master switch device 3 and also to the control valve device 5. Fluid under pressure thus supplied from the straight air pipe to the control valve device 5 flows through passage 185 therein, cavity 184 in the selector slide valve 180, passage 174 to the top of the double check valve 168, past said check valve to passage 172 leading to the top of the check valve 167, thence past check valve 167 to passage 171 and from thence through pipe 207 to the relay valve device 6.

The relay valve device 6 is operated in the usual manner by the fluid under pressure supplied through pipe 207 to supply fluid under pressure from the main reservoir pipe 208 to the brake cylinder 18 to a degree depending upon the pressure of fluid supplied to pipe 207, for thereby applying the brakes on the locomotive.

When the pressure of fluid supplied to the straight air pipe 11, relay valve 6 and diaphragm chamber 111 in the master switch 3 has attained a degree sufficient to overcome the control pressure supplied to chamber 308, the diaphragm 306 is operated to move the contact 115 out of engagement with finger 118 for thereby effecting deenergization of the application train wire 13. The application magnet 119 is consequently deenergized and spring 125 seats valve 121 cutting off further flow of fluid under pressure to the straight air pipe 11. By thus preventing a further increase in pressure in the straight air pipe and diaphragm chamber 111 of the master switch device 3, the diaphragm 306 ceases movement before contact 115 is disengaged from the release finger 117. The master switch device 3 thus operates to limit the pressure obtained in the straight air pipe 11 and relay valve device 6 to a degree which is substantially equal to that supplied to the service control pipe 20 as governed by the position of the brake valve handle 19, and the relay valve device 6 in turn operates in the usual manner to limit the pressure of fluid obtained in the brake cylinder 18 to a corresponding degree.

If the handle 19 of the brake valve device 1 is moved further into the application zone away from the release position, a corresponding increase in pressure in the service control pipe 20 is effected. The master switch device 3 then operates to effect a corresponding increase in pressure in the straight air pipe, and the relay valve device 6 in turn reproduces in the brake cylinder 18 a like increase in pressure. In other words, the brake valve device 1 may be operated, if desired, to effect a graduated application of the brakes.

It will of course be appreciated that the brakes on all cars in the train will be applied to a degree corresponding to the degree of pressure supplied to the straight air pipe.

When a straight air application of the brakes is effected, as just described, fluid supplied to the control pipe 20 flows to the double check valve 262, shifting the valve therein to its upper position and then flows through choked passage 270 to the timing reservoir 234 and diaphragm chamber 232 in the interlock valve device 9, resulting in a timed increase in the pressure of fluid in said chamber acting on the diaphragm 230.

When the relay valve device 6 operates to supply fluid under pressure to the brake cylinder 18 through pipe 209, fluid at brake cylinder pressure flows from said pipe to pipe 271 and from thence to one side of the double check valve 261, shifting the valve therein to its upper position, and then through check valve 272 to diaphragm chamber 235 in the interlock valve device 9.

If the pressure in the brake cylinder 18 and diaphragm chamber 235 of the interlock valve device increases as desired, this pressure acting on the diaphragm 231 will act to maintain the safety control pipe vent valve 239 seated against the timed build up of the opposing pressure in chamber 232 on the diaphragm 230. But if the desired pressure in the brake cylinder 18 fails to materialize within a time limit determined by the build up of pressure in diaphragm chamber 232 through the choked passage 270, then this pressure acting on the diaphragm 230 will act to move the diaphragms against the pressure of the biasing spring 237 and relieve the vent valve 239 of its seating pressure so as to permit the pressure of fluid in the safety control pipe 216 to unseat said vent valve which will then vent the safety control pipe at an emergency rate so that an emergency application of the brakes will be effected in a manner to be hereinafter described.

In other words, the interlock valve device 9 as controlled by the timing reservoir 234 and choked passage 270 is provided to ensure that an emergency application of brakes will be effected in case for any reason a straight air application fails to materialize from the fluid pressure supplied to the service control pipe 20.

Fluid under pressure supplied through pipe 207 to effect operation of the relay valve device also flows from said pipe through a pipe 273 having a restricted portion 274 to the suppression selector valve device 10 and thence past the normally unseated valve 248 to pipe 229 leading to the cut-off valve device 8, and when this pressure is increased to a predetermined degree the cut-off valve device is operated, as hereinbefore described, to close communication between the safety control pipe 216 and pipe 23. The operator may then release manual pressure on the handle 19 without effecting venting of the safety control pipe 216 and thereby obtaining an emergency application of the brakes.

*Independent release of locomotive brakes on the locomotive after an electro-pneumatic straight air application*

After a straight air application of the brakes has been effected as above described, the operator may desire to release the brakes on the locomotive without effecting a release of the brakes on the other vehicles in the train, in order to for instance avoid overheating of the driver wheels. This independent release of the locomotive brakes must be accomplished independently of the train wires 13 and 14 and straight air pipe 11, and may be effected merely by depressing handle 25 of the independent brake valve device 2. As a result of this operation the valve 88 is seated and the valve 87 is unseated and acts to supply fluid under pressure to the selector piston chamber 177 in the control valve device 5. Upon substantial equalization of the fluid pressures on the selector piston 176, spring 181 shifts said piston and the slide valve 180 to their upper position closing communication between the passage 185 from the straight air pipe 11 and passage 174. The cavity 184 in this upper position of the slide valve 180 connects passage 186, which communicates past the check valve 191 with chamber 189 below the release valve 170, to passage 175 which is connected to the atmosphere through pipe 302, past the cut-off valve 27 in the independent brake valve device 2, through chamber 30 and past the normally open self-lapping release valve 73 to chamber 66 which is open to the atmosphere through passage 67.

The opposite face of the release valve 170 outside of the seat rib 188 is subject through passage 171 to the actuating pressure on the relay valve device 6, and with chamber 189 vented, the pressure of fluid in passage 171 moves the valve piston 170 out of engagement with its seat 188 whereupon fluid pressure in pipe 207 controlling the relay valve device is vented to the atmosphere and said device then operates to vent the fluid under pressure from the brake cylinder 18 and thereby release the brakes on the locomotive.

The fluid pressure will thus be released from the relay valve device past the release valve 170 until reduced to a relatively low degree, such as for instance five pounds, at which time spring 190 will seat said release valve, and the remaining fluid pressure acting in the relay valve device will be released through the port 192 in said valve and from thence through chamber 189, passages 186 and 175 and the independent brake valve device. The release valve 170 is employed to provide a fast release of the locomotive brakes, the connection to the independent brake valve device being provided to pilot the release valve 170 and also through which a slower rate of release may be obtained under certain conditions to be later described.

If it is desired to thus hold the locomotive brakes released without having to manually hold the handle 25 depressed, said handle, after the fluid pressure is released from the relay valve device 6 and pipe 207, may be moved into the locking position and then let go of, the shoulder 109 acting in this position to hold the handle depressed, in which position selector slide valve 180 will remain in its upper position closing communication between straight air passage 185 and passage 174.

If it is desired to effect only a partial, instead of a complete, independent release of the locomotive brakes, the handle 25 at the time of being depressed is moved into the application zone to a position corresponding to the degree which it is desired to hold the brakes applied. This movement of the handle 25 acts through the cam 81 to move the release valve 73 toward the right hand, but said valve does not become seated since the fluid pressure obtained in chamber 30 from chamber 189 below the release valve 170 also moves the piston 65 outwardly, thus holding supply valve 60 seated and maintaining open the atmospheric vent past said release valve through which the fluid pressure is released from the chamber 189.

The release valve 170 is then opened by the fluid pressure in passage 171 and, as before stated, fluid pressure is released from the relay valve device 6 through pipe 207 and passage 171. While fluid pressure is thus being released from the relay valve device 6, fluid flows through port 192 in the release valve 170 to chamber 189 and thence to chamber 30 in the independent brake valve device, thus maintaining the pressure in chamber 30 substantially equal to that acting through pipe 207 in the release valve device 6, and as a consequence the piston 65 in said brake valve device is prevented from being moved into engagement with release valve 73, until the pressure in pipe 207 and therefore in chamber 30 is reduced to the degree called for by the position of the handle 25. When the pressure in chamber 30 is thus reduced to the proper degree, the piston 65 moves into seating engagement with the release valve 73 preventing further venting of fluid under pressure from chambers 30 and 189. The fluid pressure in said chambers then equalizes through port 192 in the release valve 170 whereupon spring 190 seats said valve and prevents further venting of fluid under pressure from the relay valve device 6. The fluid pressure acting in pipe 207 on the relay valve device is thus reduced to a degree called for by the position of the brake valve handle 25 in its application zone, and as a consequence, the relay valve device 6 operates to reduce the pressure in the brake cylinder 18 to a corresponding degree.

In case there is leakage of fluid under pressure from the brake cylinder 18, the relay valve device 6 will operate in the usual manner to maintain the brake cylinder pressure against such leakage, while in case there is leakage of relay control pressure from pipe 207, the consequent reduction in pressure in chamber 30 in the independent brake valve device on the piston 65 will permit spring 68 to move the piston 65 toward the left hand and through the lever 82 unseat the supply valve 60. Fluid under pressure will then be supplied to chamber 30 and thus pipe 207 until the pressure therein is increased sufficiently to move piston 65 outwardly the distance required to effect seating of the supply valve 60. The pressure in the brake cylinder 18 will thus be maintained at the pressure called for by the position of the handle 25.

When the independent brake valve device 2 is operated to effect an independent release of the locomotive brakes, as above described, it is necessary to depress the handle 19 of the brake valve device 1 in order to prevent venting of the safety control pipe 216 in case the degree of reduction in pressure in pipe 207 is sufficient to permit opening of the cut-off valve device 8.

In order to prevent the interlock valve device 9 from being operated by the timing reservoir pressure in chamber 232 upon an independent release of fluid under pressure from the brake cylinder 18 and thereby from the diaphragm chamber 235 in said device, the pipe 94, to which fluid under pressure is supplied by the independent brake valve device for shifting the selector valve piston 176 to its independent release position, is connected to the double check valve 261 thereby supplying fluid at feed valve pressure to said check valve to act in opposition to brake cylinder pressure. If the fluid at feed valve pressure sufficiently exceeds the brake cylinder pressure it will promptly shift the double check valve to its lower position, but if not, it will effect such movement upon a slight reduction in brake cylinder pressure, and then flow from pipe 94 past the check valve 272 to diaphragm chamber 235 to hold the interlock valve device 9 in the position shown so as to prevent an emergency application of the brakes.

Rapid flow of fluid under pressure into the diaphragm chamber 235 is permitted by way of the check valve 272 in order to ensure that the vent valve 239 will not be unseated upon proper operation of the equipment. Due to check valve 272, outflow of fluid from chamber 235 is restricted by a choked passage 275 by-passing said check valve and the object of this is to prevent the pressure in this chamber reducing as fast as the brake cylinder pressure is reduced so as to insure sufficient pressure to hold the vent valve 239 seated until the double check valve 261 moves and supplies fluid under pressure from the independent release pipe 94 to said chamber.

*Reapplication of the locomotive brakes after an independent release*

If it desired to reapply the locomotive brakes after effecting an independent release thereof, the handle 25 of the independent brake valve device is held depressed and moved into the application zone a degree depending upon the degree of reapplication desired. This operation of the handle 25 turns the cam 81 so as to move the plunger 80 toward the right hand. As the plunger 80 is thus moved, the beam 82 acts initially to seat the release valve 73 against its seat in the piston 65 and then turns on the end of said valve as a fulcrum and unseats the supply valve 60 whereupon fluid under pressure is supplied from the feed valve pipe 17 to chamber 30 from whence it flows past the cut-off valve 27 to pipe 302 leading to the control valve device 5.

As the pressure thus increases in chamber 30 it acts on the piston 65 to move it against the spring 68, and as said piston thus moves, the supply valve 60 moves toward its seat and becomes seated at the time the pressure in chamber 30 is built up to the degree called for by the position of the cam 81 and therefore the handle 25 in the application zone. If the handle is moved further into the application zone, the plunger 80 will be moved further toward the right hand and as a consequence, a greater movement of the piston 65 will be required to permit seating of the supply valve 60. In other words, the degree of pressure obtained in chamber 30 depends upon the extent of movement of the handle 25 into the application zone from the release position.

This fluid under pressure supplied to pipe 302 flows to the lower face of the double check valve 168 and shifts it to its upper position and then flows to passage 172 from which it flows past the double check valve 167 to passage 171 and from thence to the relay valve device 6 which is operated thereby to supply fluid at a corresponding pressure to brake cylinder 18 to reapply the brakes.

If the operator desires to retain control of the locomotive brakes independently of the straight air pipe 11, the handle 25 must be held depressed unless the degree of pressure acting on the lower face of the double check valve 168 is sufficient to hold said check valve in its upper seated position against straight air pipe pressure acting on its upper face. If this condition exists he may then, if he so desires, permit the handle 25 to be moved to its elevated position in which the selector valve device 169 will return to its lower position and reconnect the straight air pipe passage 185 to passage 174 leading to the upper face of said double check valve.

If the operator should desire to release the locomotive brakes either partially or completely after an independent application such as just described, he holds the handle 25 depressed and moves it toward the release position. This turns the cam 81 and relieves pressure on plunger 82 which permits spring 78 to move the release valve 73 relative to the piston 65 to its open position. Fluid under pressure is then vented from chamber 30 and chamber 189 below the release valve 170 in the control valve device 5 past the release valve 73 to the atmosphere. As this pressure is thus reduced, the spring 68 gradually moves the piston 65 toward the release valve 73 until at the time the pressure is reduced to a degree corresponding to the position of handle 25, said piston engages said valve to prevent further reduction. In case the handle 25 is in release position a complete release of fluid under pressure from chamber 30 will occur. The release valve 170 in the control valve device and in turn the relay valve device 6 then operate according to the reduction in pressure in chamber 30 to effect a corresponding reduction in pressure in the brake cylinder 18. In other words, the operator may release the locomotive brakes to a degree depending upon the position of the independent brake valve handle 25, but it should be remembered that said handle must be held depressed in order to prevent movement of the selector valve device 169 to its lower position which would effect a reapplication of the locomotive brakes by fluid under pressure from the straight air pipe 11, as will now be described.

The brakes on the locomotive may, if desired, be reapplied to the same degree as the train brakes, after an independent release of an application, by simply letting go of the handle 25 and permitting it to return to its upper position. In this position, the lock out valve 87 is seated and valve 88 is unseated and thus vents fluid under pressure from the selector valve piston chamber 177. The selector valve piston 176 and slide valve 180 are then moved to their lower position by the fluid pressure in valve chamber 179, and in this position reconnect the straight air passage 185 to passage 174 through which fluid under pressure is supplied from the straight air pipe 11 to the upper face of the double check valve 168. The valve 168 is thereby moved to its lower position and then fluid from passage 174 flows past the upper end of the double check valve 167 to passage 171 and thence to the relay valve device 6 which operates to reapply the brakes to a degree corresponding to the pressure in the straight air pipe. It will be noted that when a reapplication of the brakes is effected in the manner just described, the operator has no control over the degree of application. It is merely limited by the degree of pressure in the straight air pipe 11 which, under certain operating conditions may be permissible, but if it is desired to limit the degree of reapplication to some amount other than that called for by straight air pipe pressure, then the reapplication must be controlled by movement of the brake valve handle 19 into the application zone, while held depressed, as hereinbefore described.

Under certain operating conditions it may be desirable to prevent the locomotive brakes from applying with the train brakes when an electro-pneumatic straight air application is effected through the straight air pipe 11. This is accomplished by depressing the independent brake valve handle 25 and then moving it to the locking position for holding it depressed. This depressing of the handle 19 effects movement of the selector valve device 169 to its upper position in which the straight air passage 185 is disconnected from the application passage 174 and lapped, thereby closing the communication through which a straight air application of the locomotive brakes would otherwise occur.

*Release of an electro-pneumatic straight air application of the train brakes*

In order to effect the release of the train brakes after a straight air application, the brake valve device 1 is returned to its normal or running position in which fluid under pressure is vented from the service control pipe 20 and thereby chamber 308 in the master switch device 3. The straight air pipe pressure in chamber 111 of the master switch device then moves the parts thereof to the release position shown in which the supply of current to both the application and release train wires 13 and 14 is cut off. The application and release magnets 119 and 120 are thus both deenergized and as a consequence the release valve 126 is opened past which fluid under pressure is vented from the straight air pipe 11 to the atmosphere. This of course takes place locally on each car in the train.

If at the time the fluid pressure is released from the straight air pipe to effect a release of brakes on the train, the selector valve slide valve 180 is in the position connecting the relay valve device 6 to the straight air pipe, the relay valve device will operate to release the locomotive brakes in harmony with the release of fluid under pressure from the straight air pipe.

If the locomotive brakes are already released, due to the handle 25 being depressed, at the time fluid under pressure is released from the straight air pipe 11, 11, the handle 25 may then be permitted to return to its elevated position so that the locomotive brakes may apply upon a subsequent application effected by the supply of fluid under pressure to the straight air pipe.

If the locomotive brakes are applied due to operation of the independent brake valve device, and the double check valve 168 is therefore in its upper position at the time a release of brakes is effected by venting the straight air pipe 11, then in order to release the locomotive brakes, it is necessary to return the independent brake valve handle 25 to its release position in which fluid under pressure will be released from the relay valve device 6 past the upper face of double check valve 167, the lower face of double check valve 168 and thence through passage 175, pipe 302 and chamber 30 in said brake valve. If, however, a faster release of the locomotive brakes is desired, it is necessary to also depress the handle 25 in its release position, and thereby effect operation of the release valve 170 in the control valve device to vent fluid under pressure from the relay valve device 6 for effecting operation thereof to release the fluid under pressure from the brake cylinder 18.

The release of a straight air application of the brakes may be graduated if desired by operating the brake valve device 1 to reduce the pressure in the service control pipe 20 in whatever steps are desired. The master switch device 3 will respond to the reductions in pressure in the pipe 20 to effect the operation of the application and release magnet valve device 4 to effect corresponding reductions in pressure in the straight air pipe 11 and in pipe 207 leading to the relay valve device, assuming said relay valve device to be connected to said straight air pipe, and then the re-relay valve device will in turn operate to reduce the pressure in brake cylinder 18 in accordance with the reductions in pressure in said straight air pipe.

After the relay valve control pressure in pipe 207 is reduced as above described, the cut off valve device 8 will again operate to connect pipe 216 to pipe 23, unless having been previously operated during independent control of the brakes by the independent brake valve device, so that the handle 19 of the brake valve device 1 must then be held depressed in order to prevent effecting an emergency application of the brakes, as hereinbefore mentioned.

In effecting a release of brakes as above described, the fluid under pressure in diaphragm chamber 232 of the interlock valve device 9 and in the timing reservoir 234 is permitted to reduce through a check valve 276 by-passing the choked passage 270 with the reduction in pressure in the control pipe 20, while the opposing fluid pressure in diaphragm chamber 235 reduces through chocked passage 275 with brake cylinder pressure. The choked passage 275 acts at this time to ensure that the pressure in chamber 235 will not reduce ahead of that in chamber 232 thereby ensuring that the interlock valve device 9 will not be operated at this time to unseat the vent valve 239.

In case at the time the straight air pipe 11 is vented an independent application of the locomotive brakes is in effect, the diaphragm chamber 235 of the interlock valve device is supplied with fluid under pressure from the independent brake valve device through the release pipe 94, and it will be evident that this pressure will act to prevent undesired emergency operation of the interlock valve device as just described.

The choked passage 112 is provided in the connection between the straight air pipe and master switch device 3 in order to so restrict the supply of fluid under pressure to said chamber that said switch device will not prematurely move from the application position while effecting a straight air application of the brakes, while the communication including the check valve 113 by-passing the chocked passage 112 is provided to permit the pressure in chamber 111 to reduce with that in straight air pipe 11 in effecting a release of brakes.

While controlling the brakes on the locomotive and cars of a train by straight air operation as above described, the brake pipe 12 is maintained charged with fluid under pressure and the auxiliary reservoir 123 from which fluid under pressure is taken for supply to the straight air pipe 11, is maintained charged from the brake pipe through the feed groove 141 in the triple valve device, as before described.

*Automatic service application of the train brakes*

If due possibly to a failure in some part of the electropneumatic straight air system on the locomotive or cars of a train, or if the locomotive is coupled to a train of the conventional type having a brake pipe, but no straight air pipe and other straight air control apparatus, then the brakes on the locomotive and train are adapted to be controlled on the automatic principle through the brake pipe 12.

In order to control the brakes through the brake pipe 12, the selector 18' on the brake valve device 1 is turned to the automatic position. Then in order to effect a service application of the brakes, the brake valve handle 19 is turned to service position for effecting a service reduction in pressure in brake pipe 12 to the desired degree.

The triple valve device 131 responds to this service reduction and supplies fluid under pressure from the auxiliary reservoir 123 to passage 147 through which it flows to the emergency delay valve 196, which being normally ineffective opens and permits flow from passage 147 to passage 173 leading to the lower face of the double check valve 167 which is promptly moved to its upper seated position. The fluid pressure then flows from passage 173 to passage 171 and from thence to the relay valve device 6 which then operates in the usual manner to supply fluid at a corresponding pressure to the brake cylinder 18 for applying the brakes.

The emergency valve device 130 does not move to application position in response to a service rate of reduction in brake pipe pressure, as heretofore described.

When the pressure of fluid in the auxiliary reservoir 123, and thus in the triple valve chamber 137, is reduced by flow to the relay valve device 6 to a degree slightly below the reduced brake pipe pressure acting on the opposite face of the triple valve piston 133, said piston moves the auxiliary slide valve 140 to lap position, thus closing communication through the service port 149 and limiting the pressure obtained in the relay valve device 6 and consequently in brake cylinder 18.

In effecting an automatic service application of the brakes the cut-off valve device 9 is operated in the same manner as in effecting a straight air application to disconnect the safety control pipe 216 from the brake valve device 1 upon obtaining a predetermined degree of application, so as to permit the operator to let go of the safety control handle 19 without effecting an undesired emergency venting of fluid under pressure from said pipe.

The interlock valve device 9 also operates as in effecting a straight air application to ensure an application of the brakes, being controlled in this case by the build up of brake cylinder pressure in chamber 235 and by the relay valve actuating pressure from pipe 207 acting in diaphragm chamber 235, and being operative in case the brake cylinder pressure fails to materialize as intended to effect emergency venting of the safety control pipe 216.

*Independent release of locomotive brakes after an automatic service application of the train brakes*

If after the train brakes are applied by a service reduction in brake pipe pressure, it is desired to release the brakes on the locomotive independently of those on the train for reasons before described, the independent brake valve handle 25 is depressed in its release position and the selector valve device 169 and release valve 170 in the control valve device 5 are thereby operated to effect release of the locomotive brakes in the same manner as after a straight air application. After the independent release is effected however, the handle 25 may be permitted to return to its elevated position since the triple valve device 131 is at this time in lap position and the locomotive brakes will not reapply. If, however, a further reduction in brake pipe pressure is effected, a corresponding reapplication of the locomotive brakes will occur up to a full service reduction in brake pipe pressure, but any such reapplication of brakes may, if desired, be released as above described.

The degree to which the brakes on the locomotive are released upon depressing of the handle 25 may be limited if desired by moving said handle into the application zone upon depressing thereof, in the same manner as following a straight air application.

Further, after an independent release of the locomotive brakes has been effected, they may be reapplied if desired by moving the independent brake valve device into the application zone to the position required to provide the desired degree of reapplication. Fluid at the pressure thus supplied to chamber 30 flows through pipe 302 to the lower side of the double check valve 168 forcing it to its upper position, then past said check valve to the upper face of the double check valve 167 forcing it to its lower position, thence to passage 171 and pipe 207 leading to the relay valve device 6 which is operated thereby to supply fluid to the brake cylinder 18 at a corresponding pressure.

The release of a reapplication of brakes effected in the manner just described may be obtained by reverse flow through the communication just described upon movement of the independent brake valve handle 25 to release position, or may be effected by operation of the release valve 170 upon depressing said handle in the release position thereof, as hereinbefore described.

*Emergency application of train brakes*

In order to effect an emergency application of the brakes, the brake valve handle 19 is moved to emergency position and regardless of the position of the selector 18', communication is closed between the feed valve pipe 17 and brake pipe 12, and the brake pipe is opened to the atmosphere by way of the branch pipe 22, and through this communication a sudden emergency reduction in brake pipe pressure is initiated.

Both the triple valve device 131 and emergency valve device 130 respond to the emergency reduction in brake pipe pressure and move to their application positions in which fluid under pressure is supplied from both the auxiliary reservoir 123 and emergency reservoir 143 to the passage 147 leading to the lower face of the double check valve 167.

If the selector 18' on the brake valve device 1 is in the straight air position fluid under pressure is supplied to the service control pipe 20 from the brake valve device, while if the selector 18' is in the automatic position fluid under pressure is not supplied to the pipe 20 from the brake valve device. But in either case, in the emergency position of the emergency valve device 130 fluid is supplied from the emergency reservoir 143 through cavity 159 to the emergency straight air control pipe 160 leading to the double check valve 263 and it is intended that this pressure shall predominate on said check valve.

The double check valve 263 is therefore shifted to its left hand position and fluid at emergency reservoir pressure then flows from pipe 160 to diaphragm chamber 308 and operates the master switch device 3 and thereby the application and release magnet valve device 4 to supply fluid under pressure to the straight air pipe 11 and from thence, with the brake valve handle 25 in its normal elevated position, through passage 185, cavity 184 in the selector slide valve 180 to passage 174 leading to the upper face of the double check valve 167 in the control valve device 5.

The double check valve 167 is thus subjected on the lower face to the fluid pressure supplied from the auxiliary reservoir 123 and emergency reservoir 143 and on the upper face to fluid pressure from the straight air pipe, and which ever fluid pressure predominates shifts said check valve and then flows to the relay valve device 6 for operating same to effect an emergency application of the brakes.

In case the master switch device 3 or any other part of the straight air control system should fail, or if the locomotive is hauling a train not provided with a straight air control system, it will then be evident that the fluid pressure from the auxiliary reservoir 123 and emergency reservoir 143 supplied to the lower face of the double check valve 167 will shift said check valve to its upper position and then flow to passage 171 and from thence to the relay valve device 6 and operate same to effect the emergency application of brakes.

An emergency application of the brakes will also result if for any reason the operator should let go of the safety handle 19 on the brake valve device 1 when the cut-off valve device 8 is not closed. In such a case, the fluid pressure is vented from chamber 215 in the vent valve device 7 through pipe 216, the cut-off valve device 8, pipe 23 and the brake valve device 1. The pressure of fluid in chamber 220 acting on the opposite face of the piston 211 then shifts said piston upwardly into engagement with gasket 221. This movement of piston 211 closes communication through pipe 21 from the brake valve device 1 to the brake pipe 12, thereby cutting off the supply of fluid under pressure to said brake pipe, and connects said brake pipe to the lower face of piston valve 213 which is unseated by the movement of piston 211. Fluid under pressure is then vented from the brake pipe 12 through port 214 to the atmosphere at an emergency rate, thereby effecting an emergency reduction in brake pipe pressure and an emergency application of the brakes as hereinbefore described.

An emergency application of the brakes will also be initiated by operation of the interlock valve device 9 in case fluid pressure fails to materialize in the brake cylinder 18 and connected diaphragm chamber 235 of said device when either an electro-pneumatic straight air or a pneumatic service application of the brakes is effected. In such an instance, the pressure of fluid supplied to the timing reservoir 234 and diaphragm chamber 232 will act to relieve the seating pressure on the vent valve 239 and permit the safety control pressure in pipe 216 to unseat said valve, which will then vent the safety control pipe to the atmosphere. As a result, the vent valve device 7 will operate and effect an emergency application of brakes as above described.

Whenever an emergency application of the brakes is effected, fluid supplied by the emergency valve device through pipe 160 to the master switch 3 for effecting operation thereof also flows through said pipe to piston chamber 256 in the suppression selector valve device 10. The piston 247 is thereby operated to seat valve 248 and unseat valve 249, thereby venting pipe 229 to the atmosphere so as to ensure that the cut-off valve device 8 will remain open. This is particularly desirable where a safety control emergency application of the brakes is effected by operation of the brake valve handle 19, for if fluid under pressure is supplied to chamber 225 while the pipe 216 is being vented, the cut off valve 222 is liable to be closed and permit pipe 216 to be recharged by way of port 219 in the vent valve piston 211, and thereby possibly cause an undesired release of brakes. This however is prevented by venting the pipe 229.

In case the handle 25 of the independent brake valve device 2 should be in the locking position and the selector slide valve 180 therefore in its upper position at the time an emergency application of the brakes is initiated, an emergency application of the brakes on the locomotive will not be prevented, but will be effected by fluid under pressure supplied by the triple valve device 131 and emergency valve device 130 past the lower face of the double check valve 167, to passage 171 and from thence to the relay valve device 6. It will be remembered that with handle 25 in the locking position, cut-off valve 27 is closed, so that release valve chamber 189 is not open to the atmosphere and release valve 170 will remain seated. In other words, the selector slide valve 180 has no control over an application of brakes effected on the automatic principle.

*Independent release of locomotive brakes after an emergency application of the train brakes*

An operator may release the locomotive brakes independently of the train brakes after an emergency application by moving the handle 25 to release position and depressing same and thereby effecting operation of the release valve 170 in the control valve device 5, as hereinbefore described.

After an automatic emergency application of the brakes is effected, by operation of the triple valve device 131 and emergency valve device 130, these devices will remain in their application positions connecting the auxiliary reservoir 123 and emergency reservoir 143 to the relay valve device 6, until a subsequent release of the brakes is effected, and it will therefore be evident that in effecting an independent release of the locomotive brakes as just described, the fluid under pressure from said reservoirs will tend to release with that from the relay valve pipe 207 upon opening of the release valve 170. However, a choke 283 is provided in passage 173 to so restrict the flow of fluid from the auxiliary and emergency reservoirs to the release valve 170 upon opening thereof as to have no material retarding effect upon venting the fluid pressure from the relay valve device 6 through pipe 207 to the atmosphere. Due to the use of choke 283 a quick, independent release of the brakes on the locomotive after an automatic emergency application may be effected if desired. The choke 283 is sufficiently large however as to have substantially no control over the rate at which an automatic emergency application of the brakes is obtained.

In order to prevent the locomotive brakes from reapplying after an independent release, it is of course necessary to hold the independent brake valve handle 25 in the depressed position so that the release valve 170 may continue to release fluid under pressure supplied to passage 171 from the auxiliary and emergency reservoirs through the choke 283 until all fluid pressure is vented from said reservoirs. In case the emergency application was effected from the straight air pipe 11, it will be necessary that the handle 25 be held depressed so long as it is desired to prevent the locomotive brakes reapplying or until a subsequent release of all brakes is effected.

*Release of train brakes following an emergency application*

In order to effect a release of the train brakes after an emergency application, the brake valve handle 19 is returned to its normal or running position in which safety control pipe 20 is vented and the brake pipe is recharged with fluid under pressure. The handle 19 is also depressed so that the safety control pipe 216 will be recharged and the vent valve device 7 therefore held in its normal position.

The triple valve device 131 and emergency valve device 130 are returned to their normal or release positions in which the automatic application passage 147 is vented through the triple valve device and the emergency control pipe 160 is vented through the emergency valve device. The master switch device 3 then returns to its normal position in which opening of the magnet controlled release valve 126 is effected which vents the straight air pipe. If the brakes on the locomotive are applied at this time they will be released either upon venting of the straight air pipe 11 or automatic application passage 147 as hereinbefore described. The auxiliary and emergency reservoirs will be recharged with fluid under pressure from the brake pipe, and the whole equipment thus conditioned for a subsequent application of the brakes.

*Locking position of independent brake valve*

The locking position of the brake valve handle is provided to maintain the selector slide valve 180 in its upper position for thereby preventing, when desired, a straight air application of the brakes on the locomotive, but it does not prevent an automatic application of the locomotive brakes since such is effected through a communication established past the lower face of the double check valve 167 and is therefore independent of said selector slide valve, as above described.

However, in the upper position of the selector slide valve 180, the chamber at the lower side of the independent release valve 170 is connected to pipe 302 leading to the independent brake valve device, and in order to prevent an automatic application of brakes being released through this communication in case the handle 25 should unintentionally be left in locking position when controlling the brakes through the brake pipe, the cut-off valve 27 is provided and closed in the locking position.

In order to ensure that the cut-off valve 27 will be closed before the handle 25 is locked down and therefore the selector slide valve 180 locked in its upper position, the two steps 108 and 109 are provided through which the independent brake valve handle must be moved to the locking position. The depression of the handle required to move under the step 108 is all taken up by the spring 100 and does not affect valve 87, but the rotative movement of said handle from release position to that under the step 108 is sufficient to allow seating of the cut-off valve 27. Then movement from beneath the step 108 to the locking position under step 109 unseats the valve 87 and shifts the selector slide valve 180 to its upper position. Thus seating of the cut-off valve 27 is ensured before the handle 25 obtains the locking position, so that the release of an automatic application of brakes cannot occur in case said handle should accidentally be in locking position at that time.

*Delayed emergency application*

In the operation of the equipment hereinbefore described, the emergency delay valve device 166 was considered as cut out and therefore ineffective. When ineffective, a service choke 278 acts to control the rate at which the brakes are applied upon a service reduction in brake pipe pressure, while upon an emergency reduction in brake pipe pressure the rate of application is controlled by the combined flow capacities of the service choke 278 and an emergency choke 279.

The delay valve device 166 can be cut out of operation and therefore be ineffective as above described under all conditions except where the locomotive may be employed at some time or other to control a relatively long train in which the action of slack between the cars must be considered in order to avoid damaging or possibly wrecking of a train when an emergency application of the brakes is effected.

In case the locomotive will never be employed to control trains where the action of slack must be taken into consideration, the delay valve device 166 may be dispensed with entirely and in its place, a cover 280 may be applied to the control valve device 5. The cover 280 is provided with a passage 281 for connecting passages 147 and 173 so that the equipment will operate as hereinbefore described. If the delay valve device is thus dispensed with, the cock 202 shown beneath the independent brake valve device 2 may also be dispensed with.

However, where it is desired to have the locomotive equipped to control a relatively long train in which slack action must be considered, such as for instance in freight trains exceeding possibly 75 cars in length, the delay valve device 166 is associated with the control valve device 5 as shown, and in order to condition said delay valve device for long train operation, the cock 202 is turned from the position shown in the drawings to that in which the feed valve pipe 17 is connected through port 204 in the plug valve 203 to pipe 53. In this position fluid under pressure is supplied from the feed valve pipe through the choke 206 to pipe 53 and from thence to diaphragm chamber 194 in the delay valve device, wherein it acts on the diaphragm 193 to maintain the delay valve 196 seated.

With the valve 196 seated, the choked passage 198 connecting passages 147 and 173 becomes effective to reduce the rate at which the brakes are automatically applied on the locomotive to a degree where the inertia of the locomotive will be permitted to act to retard the gathering of the slack in the train for a period of time sufficient to prevent possible damage to the train due to harsh gathering of the slack. A release of the brakes following an application as just described is effected by way of check valve 200 and through passage 199, so that the choked passage 198 cannot retard the release.

While it is intended that the brakes on the locomotive will be controlled by the independent brake valve device 2 when the locomotive is operating by itself around a yard or the like, it is however possible that the brake valve device 1 may be employed instead, and be turned to the emergency position for stopping the locomotive. If the emergency delay valve device 166 should happen to be effective when the brake valve device 1 is turned to emergency position, it is of course possible that the delayed emergency application of brakes will not stop the locomotive as quickly as desired, with the possible result that it might run into other rolling stock and cause damage to itself or other property. However, if the attendant immediately recognizes the situation, he may turn the independent brake valve handle 25 into the application zone and thereby unseat the delay valve 28 and vent the fluid pressure from chamber 194 in the emergency delay valve device 166. This will permit unseating of the delay valve 196 and consequently the normal rapid emergency flow of fluid under pressure from passage 147 to passage 173 and therefore the rapid application of brakes be intended to obtain by operation of the brake valve handle 19.

The choke 206 is provided to so restrict the supply of fluid under pressure to the emergency delay valve pipe 53, that prompt venting thereof may be obtained upon opening the delay valve 28 by turning the independent brake valve handle 25 into the application zone.

When the handle 19 of the brake valve device 1 is in the normal or running position, the brakes on the locomotive may be operated by the independent brake valve device 2 as desired. If it is desired to apply the locomotive brakes the handle 25 may be moved into the application zone thereby effecting the supply of fluid to chamber 30 and from thence past the double check valve 167 to the relay valve device 6 at a pressure depending upon the position of said handle in said zone. A release of the brakes after such an application may be effected by moving the handle 25 back toward or to the release position and a corresponding release of fluid under pressure from the relay valve device will occur by way of check valve 167 and through chamber 30. In thus controlling the locomotive brakes, it is not necessary that the handle 25 be in the depressed position.

Double heading

It is possible that a locomotive provided with this equipment may at some time or other be hauled in a train dead, or may be used as a non-control unit in double heading. In both cases, it is desired to condition the brake valve device 1 and master switch device 3 on the non-control locomotive, so that neither can be operated unintentionally or otherwise to interfere with the usual service control of brakes on the train from the locomotive in control. In order to accomplish this, a double heading cock 284 is provided controlling communication between the service control pipe 20 and brake valve device 1, and between the brake pipe 12 and vent valve device 7 and thereby said brake valve device. This cock is normally carried in the open position shown in Fig. 1, but in either double heading or being hauled as a dead locomotive, the cock is turned to the position shown in Fig. 6 of the drawings in which the brake pipe 12 is cut off from the vent valve device 7 and the service control pipe 20 is cut off from the brake valve device 1.

It will therefore be evident that with the double heading cock in this closed position the brake valve device 1 has no control over a service application of brakes effected through the straight air pipe 11 or brake pipe 12, nor over a subsequent release of such an application. The connection from the brake pipe 12 through pipe 22 to the brake valve device 1 is however maintained open, so that an emergency application of brakes may be effected at any time by the operator on the non-control locomotive, if he finds such is necessary.

It is also desirable that the brake pipe be disconnected from the vent valve device 7 and brake valve device 1 in order that in charging the brake pipe from the control locomotive, the increase in brake pipe pressure cannot act in chamber 220 on piston 211 and possibly effect unseating of the vent valve 213 which would then vent the brake pipe.

When the double heading cock 284 is in the double heading position shown in Fig. 6 of the drawings, both sides of the control pipe 20 are placed in communication with the atmosphere, the brake valve device side through a port 285 and the master switch device side through a port 286.

The master switch device side of the control pipe 20 is vented as just described in order to prevent unintended operation of the master switch device which otherwise might possibly occur in case there was leakage of fluid under pressure into chamber 308.

The brake valve side of the control pipe 20 is vented in order to call the operator's attention to the condition of the double heading cock, if after being in double heading service or the like, the locomotive becomes the control unit for a train and the operator forgets or neglects to turn the double heading cock out of double heading position. The operator is warned of this condition of the double heading cock as soon as he attempts to make a straight air application of brakes due to the flow of fluid under pressure from the port 285, and will therefore properly condition said cock for the control of the train.

In double heading, the pipes 302 and 94 are adapted to be connected between the locomotives and a cock 288 is provided adapted to be turned on the non-control locomotive from the normally open position shown in the drawings to a closed position for closing communication through said pipes to the independent brake valve device 2 and from thence to the atmosphere on the non-control locomotive. The equipment is thereby conditioned on the non-control locomotive for control by the independent brake valve device on the control locomotive so that the brakes on both locomotives will operate in harmony.

Double ending

In certain high speed passenger train service, a locomotive is provided at both ends of the train for hauling the train in either direction, the leading locomotive being the control locomotive, and the brakes on the trailing locomotive operating in harmony with those on the cars of the train. In such service, the cocks 284 and 288 on the trailing locomotive are both closed so as to cut out both brake valves and the safety control features at the rear of the train. The pipes 302 and 94 are not connected between the locomotives in such service.

In changing control ends on a train such as just mentioned, it is necessary that the operator effect an automatic service application of the brakes at the end he is leaving in order to hold the train while changing ends. He is then required to close the cock 284 to cut out the brake valve device 1 and vent valve device 7, and to also vent chamber 308 of the master switch device 3 so that it will remain in the position shown and therefore not interfere with the straight air control of brakes from the other end of the train. He may then change control ends and release the brakes at the new control end and be ready to proceed.

In order to ensure that the application of the brakes will be effected through the brake pipe only upon changing ends, both sides of the service control pipe 20 are vented upon closing the double heading cock 284, so that in case the application was effected by straight air the brakes will be released upon closing the double heading cock. Thus the operator has no alternative upon changing ends but to turn the selector 18' to automatic position and apply the brakes through the brake pipe and thereby ensure that the master switch device 3 will be in its release position as shown, so as not to interfere with the control of brakes from the other end of the train.

If desired, a switch 289, controlled in any desired manner, may be provided to cut off the battery 116 from the master switch device 3 on a non-control locomotive.

From the above description it will be evident that the improved locomotive equipment provides for flexible control of the brakes on the locomotive and a train equipped with any type of passenger or freight brake equipment in use, and at the same time provides for flexible control of the brakes on the locomotive independently of those on the train, so that the locomotive may be adjusted, regardless of the train, to all conditions under which it may operate.

While one illustrative embodiment of our invention has been described in detail, it is not our intention to limit its scope to this embodiment or otherwise than by the terms of the appended claims.

Having now described our invention, what we claim as new and desire to secure by Letters Patent, is:

1. In a braking system, in combination, a straight air train pipe, means for varying the fluid pressure in said train pipe, a brake valve device having a normal position and movable to another position, and means governed by the variations in pressure in said train pipe for controlling the brakes on a vehicle so long as said brake valve device is in the said normal position, and being also responsive to operation of said brake device upon movement to the said other position to independently control the vehicle brakes.

2. In a braking system, in combination, a train pipe, means for varying the fluid pressure in said train pipe, a brake valve device having a normal position and movable to another position, valve mechanism for controlling the brakes on a vehicle, and means operative in the normal position of said brake valve device for rendering said valve mechanism responsive to the variations in fluid pressure in said train pipe and being operative in the other position of said brake valve device to render said valve mechanism non-responsive to variations in fluid pressure in said train pipe, said brake valve device being operative upon movement out of said normal position to independently control said valve mechanism.

3. In a braking system, in combination, a train pipe, means for varying the fluid pressure in said train pipe for normally controlling the application and release of the brakes on a vehicle, valve means operative in a first position to open communication through which the brakes on the vehicle are controlled from said train pipe and operative in a second position to close said communication to render said brakes non-responsive to train pipe pressure, and a brake valve controlling said valve means and having a normal position for effecting movement of said valve means to said first position, and being operative upon movement out of said normal position to effect movement of said valve means to said second position, and being operable then to control said brakes independently of the pressure of fluid in said train pipe.

4. In a braking system, in combination, a straight air train pipe to which fluid under pressure is adapted to be supplied for effecting an application of brakes and from which fluid under pressure is adapted to be vented for effecting a release of brakes, valve means controlling communication through which said brakes are controlled by fluid pressure from said straight air pipe, and a brake valve device controlling said valve means and operative in a normal position to effect operation of said valve means to open said communication, and operative upon movement to another position to effect operation of said valve means to close said communication and open a communication to said brake valve device for rendering said brake valve device effective to control the application and release of said brakes independently of said straight air pipe.

5. In a braking system, in combination, a straight air train pipe to which fluid under pressure is adapted to be supplied for effecting an application of brakes, valve means controlling communication through which said brakes are controlled by fluid pressure from said straight air pipe, and a brake valve device controlling said valve means and having a normal position for effecting operation of said valve means to open said communication and another position for effecting operation of said valve means to close said communication and open another communication for effecting a release of the brakes independently of the pressure of fluid in said straight air pipe.

6. In a braking system, in combination, a train pipe in which variations in fluid pressure is adapted to control the application and the release of brakes on a vehicle, valve means controlling communication through which the brakes are controlled by the fluid pressure in said train pipe and having one position for opening said communication and another position for closing said communication and establishing another communication for effecting a release of brakes independently of the fluid pressure in said train pipe, and a brake valve device controlling said valve means and operative in a normal position to effect movement of said valve means to the first named position and operative upon movement out of said normal position to effect movement of said valve means to the second named position.

7. In a braking system, in combination, a train pipe in which variations in fluid pressure is adapted to control the application and the release of brakes on a vehicle, valve means controlling communication through which the brakes are controlled by the fluid pressure in said train pipe and having one position for opening said communication and another position for closing said communication and establishing another communication for effecting a release of brakes independently of the fluid pressure in said train pipe, and a depressible brake valve handle controlling said valve means and operative in a normal elevated position to effect movement of said valve means to its first named position and operative upon depression to effect movement of said valve means to its second named position.

8. In a braking system, in combination, a train pipe in which variations in fluid pressure is adapted to control the application and release of brakes on a vehicle, a brake valve device having a normally elevated, depressible handle, and means operative in the elevated position of said handle to render said brakes responsive to the variations in fluid pressure in said train pipe and in the depressed position to render said brakes non-responsive.

9. In a braking system, in combination, a train pipe in which variations in fluid pressure is adapted to control the application and release of brakes on a vehicle, a brake valve device having a normally elevated, depressible handle, and means operative in the elevated position of said handle to render said brakes responsive to the variations in fluid pressure in said train pipe and in the depressed position to render said brakes non-responsive and to establish a communication for effecting a release of said brakes.

10. In a braking system, in combination, a train pipe in which variations in fluid pressure is adapted to control the application and release of brakes on a vehicle, a brake valve device having a normally elevated, depressible handle, and means operative in the elevated position of said handle to render said brakes responsive to the variations in fluid pressure in said train pipe and in the depressed position to render said brakes non-responsive, and means for locking said handle in said depressed position.

11. In a braking system, in combination, a train pipe in which variations in fluid pressure is adapted to control the application and release of brakes on a vehicle, a normally elevated brake valve handle having a release position and being depressible in said position and movable from said release position to another position, means operative in said other position to hold said handle depressed, and means operative in the elevated position of said handle to render said brakes responsive to fluid pressure in said train pipe and in the depressed position non-responsive and to establish a communication through which a release of the brakes is adapted to be effected independently of the fluid pressure in said train pipe.

12. In a braking system, in combination, a train pipe in which variations in fluid pressure is adapted to control the application and release of brakes on a vehicle, a brake valve device for controlling said brakes independently of said train pipe, said brake valve device having a normally elevated, depressible handle, and means operative in the elevated position of said handle to render said brakes responsive to variations in pressure in said train pipe and in the depressed position of said handle to render said brakes responsive to the operation of said brake valve device.

13. In a braking system, in combination, a train pipe in which variations in fluid pressure is adapted to control the application and release of brakes on a vehicle, a brake valve device having a release position for effecting a release of the brakes, a locking position for preventing an application of brakes and being movable to still another position for effecting an application of brakes, said brake valve device having a normally elevated, depressible handle, means conditioned upon elevation of said handle to render said brakes responsive to variations in pressure in said train pipe and upon depression of said handle to render said brakes non-responsive to train pipe pressure and responsive to the operation of said handle, and means operative in the locking position of said handle to hold same in the depressed condition.

14. In a braking system, in combination, a train pipe, a brake valve device for varying the pressure of fluid in said train pipe for controlling the application and release of brakes, valve means controlled by the variations in fluid pressure in said train pipe for controlling the application and release of brakes on a vehicle, an independent brake valve device for controlling the brakes on said vehicle independently of said train pipe, a handle for operating said independent brake valve device and having a normal position, and means controlled by said independent brake valve device operative in the normal position of said handle to render said valve means responsive to train pipe pressure and operative upon movement of said handle out of said normal position to render said valve means non-responsive to train pipe pressure and responsive to operation of said independent brake valve device, and means for locking said handle in the condition for rendering said valve means non-responsive to train pipe pressure.

15. In a braking system, in combination, a train pipe in which variations in pressure are operative to control the application and release of the brakes on a vehicle, valve means having a normal position establishing communication through which said application and release is adapted to be effected and movable to another position for closing said communication and establishing another communication through which a release of the brakes is adapted to be effected independently of said train pipe, and a normally elevated, depressible brake valve handle operative in the elevated position to effect movement of said valve means to said normal position and operative upon being depressed to effect movement of said valve means to its other position.

16. In combination, a straight air train pipe, means operative upon an increase in pressure in said straight air pipe to effect an application of brakes and upon a reduction in the fluid pressure in said straight air pipe to effect a release of the brakes, valve means controlling communication through which the brakes are controlled from said straight air pipe, and a brake valve device having a normal position for applying fluid under pressure to effect operation of said valve means to open said communication and having another position for venting fluid under pressure to effect operation of said valve means to close said communication.

17. In combination, a straight air train pipe, means operative upon an increase in pressure in said straight air pipe to effect an application of brakes and upon a reduction in the fluid pressure in said straight air pipe to effect a release of the brakes, valve means controlling communication through which the brakes are controlled from said straight air pipe, and a brake valve device having one position for effecting operation of said valve means to open said communication and another position for effecting operation of said valve means to close said communication and open another communication for effecting a release of the brakes independently of said straight air pipe.

18. In combination, a straight air train pipe, means operative upon an increase in pressure in said straight air pipe to effect an application of brakes and upon a reduction in the fluid pressure in said straight air pipe to effect a release of the brakes, a valve device for effecting a release of the brakes independently of said straight air pipe, valve means having a normal position establishing communication through which the brakes are controlled from said straight air pipe and movable to another position for closing said communication and for effecting the operation of said valve device to effect a release of the brakes, and a brake valve device for controlling said valve means and having a normal position for positioning said valve means in its normal position and operative upon movement out of said normal position to effect movement of said valve means to the position for effecting operation of said release valve device.

19. In combination, a brake pipe, means operative upon a reduction in brake pipe pressure to effect an application of the brakes and upon an increase in brake pipe pressure to effect a release of the brakes, valve means controlling a communication through which a release of the brakes is adapted to be effected independently of the variation of pressure of fluid in said brake pipe, and a brake valve device having a normal position for effecting operation of said valve means to close said communication and adapted to be conditioned for effecting operation of said valve means to open said communication, resilient means operative to return said brake valve device to said normal position, and means for locking said brake valve device in a position in which the brake valve device is conditioned for effecting said operation of said valve means.

20. In combination, a brake pipe, means operative upon a reduction in brake pipe pressure to effect an application of the brakes and upon an increase in brake pipe pressure to effect a release of the brakes, valve means controlling a communication through which a release of the brakes is adapted to be effected independently of the variation of pressure of fluid in said brake pipe, and a brake valve device having a normal position for effecting operation of said valve means to close said communication and adapted to be conditioned for effecting operation of said valve means to open said communication, resilient means operative to return said brake valve device to said normal position, means for locking said brake valve device in a position where the brake valve device is conditioned for effecting said operation of said valve means, and a valve device controlling communication through which a release of the brakes is adapted to be effected by said valve means and operative upon the locking of said brake valve device to close the release communication.

21. In combination, a straight air train pipe, means operative upon an incease in pressure in said straight air pipe to effect an application of brakes and upon a reduction in the fluid pressure in said straight air pipe to effect a release of the brakes, valve means non-responsive to the pressure of fluid in said train pipe for controlling communication through which the brakes are controlled from said straight air pipe, and a brake valve device operative to effect operation of said valve means to close said communication and then control the application and release of said brakes independently of the pressure of fluid in said straight air pipe.

22. In combination, a brake pipe, means operative upon a reduction in brake pipe pressure to effect an application of the brakes and upon an increase in brake pipe pressure to effect a release of the brakes, valve means controlling a communication through which a release of the brakes is adapted to be effected independently of the variation of pressure of fluid in said brake pipe, and a brake valve device having a normal position for effecting operation of said valve means to close said communication and adapted to be conditioned for effecting operation of said valve means to open said communication, and operative when so conditioned to effect an application and release of the brakes independently of the fluid pressure in said brake pipe.

23. In a braking system, in combination, a train pipe in which the pressure of fluid is adapted to be varied, brake control means normally responsive to the variations in pressure in said train pipe for effecting an application and release of brakes on a vehicle, a self-lapping brake valve device operative to vary the pressure of fluid in a chamber in accordance with a predetermined adjustment thereof, and means controlled by said brake valve device and adapted to be conditioned thereby to establish communication between said brake control means and chamber whereby said brake control means is controlled by the pressure of fluid in said chamber independently of said train pipe.

24. In a braking system, in combination, a train pipe in which the pressure of fluid is adapted to be varied, brake control means normally responsive to the variations in pressure in said train pipe for effecting an application and release of brakes on a vehicle, a self-lapping brake valve device operative to vary the pressure of fluid in a chamber in accordance with a predetermined adjustment thereof, valve means controlled by said brake valve device for controlling communication through which the brakes on the vehicle are controlled from said train pipe and operative to close said communication and establish communication between said brake control means and chamber whereby said brake control means is adapted to be controlled by said brake valve device.

25. In a braking system, in combination, a train pipe in which the pressure of fluid is adapted to be varied, brake control means normally responsive to the variations in pressure in said train pipe for effecting an application and release of brakes on a vehicle, a self-lapping brake valve device having a chamber, a normally elevated, depressible handle for moving said brake valve device to a release position for venting said chamber and being movable into an application zone for supplying fluid under pressure to and releasing fluid under pressure from said chamber to a degree dependent upon the position of said handle in said zone, and valve means controlled by and in accordance with the position of said handle and operative upon depression thereof to connect said means to said chamber for effecting a release of the brakes to a degree dependent upon the position of said handle.

26. In a braking system, in combination, a brake pipe, means adapted to operate in accordance with variations in pressure in said brake pipe to effect the application and release of brakes on a vehicle, a straight air pipe, said means being adapted to also operate in accordance with variations in pressure in said straight air pipe to effect the application and release of the brakes on the vehicle, means operative to close communication through which the brakes are adapted to be controlled from said brake pipe upon control of the brakes from said straight air pipe and operative to close communication through which the brakes are adapted to be controlled from said straight air pipe upon control of the brakes from said brake pipe, valve means operative to effect the release of an application of the brakes effected by a variation in fluid pressure in either of said pipes, and an independent brake valve device operative to control the operation of said valve means.

27. In a braking system, in combination, a brake pipe, means adapted to operate in accordance with variations in pressure in said brake pipe to effect the application and release of brakes on a vehicle, a straight air pipe, said means being adapted to also operate in accordance with variations in pressure in said straight air pipe to effect the application and release of the brakes on the vehicle, means operative to close communication through which the brakes are adapted to be controlled from said brake pipe upon control of the brakes from said straight air pipe and operative to close communication through which the brakes are adapted to be controlled from said straight air pipe upon control of the brakes from said brake pipe, valve means having a normal position opening communication through which the brakes are controlled from said straight air pipe and movable to another position to close said communication and establish another communication for effecting the release of an application of brakes effected from either of said pipes, and a brake valve handle having a manually elevated position for effecting movement of said valve means to the normal position and having a depressed position for effecting movement of said valve means to its other position.

28. In a braking syntem, in combination, a brake pipe, means adapted to operate in accordance with variations in pressure in said brake pipe to effect the application and release of brakes on a vehicle, a straight air pipe, said means being adapted to also operate in accordance with variations in pressure in said straight air pipe to effect the application and release of the brakes on the vehicle, means operative to close communication through which the brakes are adapted to be controlled from said brake pipe upon control of the brakes from said straight air pipe and operative to close communication through which the brakes are adapted to be controlled from said straight air pipe upon control of the brakes from said brake pipe, an independent brake valve device for controlling the brakes on the vehicle independently of said pipes, and means operative upon operation of said brake valve device to close communication through which the brakes are adapted to be controlled from said pipes.

29. In a braking system, in combination, a brake pipe, brake means operative by fluid under pressure to effect an application of the brakes on a vehicle and operative upon the release of fluid under pressure to effect a release of the brakes on the vehicle, valve means movable to a position upon a reduction in brake pipe pressure to connect a source of fluid under pressure to said brake means to effect the operation thereof to apply the brakes, choke means in the communication between said source and said brake means, and an independent brake valve device operative to effect venting of fluid under pressure from said brake means at a rate exceeding the rate of supply through said choke means for effecting a release of the brakes.

30. In a braking system, in combination, a straight air train pipe to and from which fluid under pressure is supplied and released for effecting respectively an application and a release of the brakes on a vehicle, valve means having a normal position opening communication through which the brakes are controlled from said straight air pipe and movable to another position for closing said communication and opening another communication through which a release of the brakes is adapted to be effected, and a manually operative depressible member having an elevated position for effecting movement of said valve means to its normal position and a depressed position for effecting movement of said valve means to its other position, said member being manually depressed, and means operative upon the release of manual pressure on said element to shift same to its elevated position.

31. In a braking system, in combination, mechanism operative by fluid under pressure to effect an application of the brakes on a vehicle and operative upon the release of fluid under pressure to effect a release of the brakes on the vehicle, means for supplying and releasing fluid under pressure to and from a communication leading to said mechanism, valve means controlling said communication, a self-lapping brake valve device comprising a normally elevated, depressible handle having a release position and an application and release zone, said handle being operative in its depressed position to effect operation of said valve means to close said communication and establish a fluid communication between said mechanism and said brake valve device through which said mechanism is adapted to be controlled by said brake valve device.

32. In a braking system, in combination, mechanism operative by fluid under pressure to effect an application of the brakes on a vehicle and operative upon the release of fluid under pressure to effect a release of the brakes on the vehicle, means for supplying and releasing fluid under pressure to and from a communication leading to said mechanism, valve means controlling said communication, a self-lapping brake valve device comprising a normally elevated, depressible handle having a normal release position, an application and release zone at one side of said position and a locking position at the opposite side of said release position for holding said handle in a depressed condition, said handle being operable upon depression in any position thereof to effect operation of said valve means to close said communication and establish a communication between said mechanism and said brake valve device, said brake valve device further comprising a self-lapping mechanism operative when in communication with said mechanism to effect a release of fluid under pressure therefrom in the release and depressed positions of said handle and to vary the fluid pressure thereon upon movement into the application and release zone in accordance with the position of said handle in said zone.

33. In a braking system, in combination, means operative by fluid under pressure to effect an application of brakes and operative upon the relief of fluid under pressure to effect a release of brakes, a brake valve device comprising a normally elevated, depressible handle having a release position and an application and release zone, and valve means operative when said handle is in the depressed position to effect a release of fluid under pressure from said means and operative upon movement of said handle into said zone to vary the pressure of fluid on said means according to the degree of movement into said zone, said handle being movable into a locking position, means for holding said handle depressed in said locking position, and a valve operative to close communication between said means and brake valve device upon movement of said handle into locking position.

34. A brake valve device comprising a casing, a shaft in said casing, a normally elevated, depressible handle operative in either the elevated or depressed condition to turn said shaft from a release position in one direction through an application and release zone, and operative to turn said shaft in the opposite direction to a locking position, means for causing two successive steps of depression of said handle upon movement of the handle from the release position to the locking position, a self-lapping valve mechanism, a cam on said shaft for controlling the operation of said mechanism upon movement of said shaft to the release position and into said zone, a valve for controlling communication through a passage to said self-lapping mechanism, a cam on said shaft operative to effect movement of said valve to open said passage with the self-lapping mechnism in release position and positioned in said zone and operative to effect movement of said valve to close said passage upon movement of said handle during the first step of movement toward said locking position, and valve means for also controlling communication through said passage and having one position for effecting closure of the communication and another position for effecting opening of the communication, said valve means being movable to one of its positions upon elevation of said handle in the release position and in positions in said zone and being movable to its other position upon depression of said handle in the release position and in positions in said zone and upon movement of said handle from said first step to said locking position.

35. In a brake system, in combination, a brake pipe, means operative by fluid under pressure to effect an application of the brakes, valve means operative upon either a service or an emergency reduction in brake pipe pressure to supply fluid under pressure to said means through either one communication at one rate or through another communication at a restricted rate, a valve device controlling said first mentioned communication and operative to either close said first mentioned communication for rendering the restricted communication effective or to open said first mentioned communication to render said restricted communication ineffective, and means for controlling the operation of said valve device.

36. In a braking system, in combination, a brake cylinder, means operative to effect a variation in fluid pressure for effecting a supply of fluid under pressure to said brake cylinder for applying the brakes, valve means controlled by both the said variation in fluid pressure and the pressure in said brake cylinder and operative upon failure of the brake cylinder pressure to develop to effect an emergency application of the brakes, and an independent brake valve device operative to effect a release of the fluid pressure supplied to said brake cylinder by the operation of said means, and at the same time to supply fluid under pressure to said valve means to prevent operation thereof upon the release of fluid under pressure from said brake cylinder.

37. In a braking system, in combination, a brake cylinder, means operative to effect a variation in fluid pressure for effecting a supply of fluid under pressure to said brake cylinder for applying the brakes, valve means controlled by both the said variation in fluid pressure and the pressure in said brake cylinder and operative upon failure of the brake cylinder pressure to develop to effect an emergency application of the brakes, and an independent brake valve device operative to effect a release of the fluid pressure supplied to said brake cylinder by the operation of said means, and at the same time to supply fluid under pressure to said valve means to prevent operation thereof upon the release of fluid under pressure from said brake cylinder, a passage through which fluid may flow from the brake cylinder to said valve means, a check valve for preventing back flow through said passage, and a restricted by-pass passage through which fluid may flow from said valve means to the brake cylinder.

38. In a braking system, in combination, a straight air train pipe, a control device operative upon the supply of fluid under pressure thereto to effect a supply of fluid under pressure to said straight air pipe for effecting an application of the brakes and operative upon the release of fluid under pressure therefrom to effect a release of fluid under pressure from said straight air pipe and thereby a release of the brakes, a brake valve device for supplying fluid under pressure to and releasing fluid under pressure from said control device, and a cock normally establishing communication between said brake valve device and control device and operative to close said communication and vent the communication at the control device side of said cock.

39. In a braking system, in combination, a straight air train pipe, a control device operative upon the supply of fluid under pressure thereto to effect a supply of fluid under pressure to said straight air pipe for effecting an application of the brakes and operative upon the release of fluid under pressure therefrom to effect a release of fluid under pressure from said straight air pipe and thereby a release of the brakes, a brake valve device for supplying fluid under pressure to and releasing fluid under pressure from said control device, and a cock normally establishing communication between said brake valve device and control device and operative to close said communication and vent both the relay and brake valve sides thereof.

40. In a braking system, in combination, a brake pipe, a brake valve device operative to supply fluid under pressure to and release fluid under pressure from said brake pipe, a vent valve device operative to effect an emergency reduction in brake pipe pressure, safety control means normally subject to manual pressure and operative upon the release of manual pressure to effect the operation of said vent valve device, and a cock normally establishing communication between said brake pipe and said brake valve device and vent valve device and movable to a position for closing said communication.

41. In a braking system, in combination, a straight air train pipe, a control device operative upon the supply of fluid under pressure thereto to effect a supply of fluid under pressure to said straight air pipe for effecting an application of the brakes and operative upon the release of fluid under pressure therefrom to effect a release of fluid under pressure from said straight air pipe and thereby a release of the brakes, a brake pipe, variations in fluid pressure in which are adapted to control the brakes, a brake valve device adjustable to control the brakes either through said straight air pipe or said brake pipe, and a cock normally establishing communication through a passage between said brake valve device and said control device and brake pipe and operative to close communication between said brake valve device, and said brake pipe and control device.

42. In a braking system, in combination, a straight air train pipe, a control device operative upon the supply of fluid under pressure thereto to effect a supply of fluid under pressure to said straight air pipe for effecting an application of the brakes and operative upon the release of fluid under pressure therefrom to effect a release of fluid under pressure from said straight air pipe and thereby a release of the brakes, a brake pipe, variations in fluid pressure in which are adapted to control the brakes, a brake valve device adjustable to control the brakes either through said straight air pipe or said brake pipe, and a cock normally establishing communication through a passage between said brake valve device and said control device and brake pipe and operative to close communication between said brake valve device, and said brake pipe and control device and vent said passage at both sides of said cock.

43. In a braking system, in combination, a train pipe, valve means responsive to variations in pressure in said train pipe for controlling the brakes on a vehicle, a brake valve device for effecting variations in pressure in said train pipe, an independent brake valve device, means responsive to operation of said independent brake valve device for rendering said valve means non-responsive to variations in train pipe pressure and responsive to operation of said independent brake valve device, and manually operated valve means normally connecting said train pipe and valve means to said brake valve devices for control thereby and movable to a position for cutting said brake valve devices out of control of said train pipe and valve means.

44. In a braking system, in combination, a straight air pipe, a brake pipe, means operative in accordance with variations in pressure in said pipes for controlling the application and release of brakes on a vehicle, a relay controlled by variations in a pilot fluid pressure for effecting variations in fluid pressure in said straight air pipe, a brake valve device for controlling said pilot fluid pressure and for effecting variations in pressure in said brake pipe, an independent brake valve device for controlling the operation of said means, valve means controlled by said independent brake valve device and operative in one position thereof to condition said means for control from said straight air pipe and brake pipe, and in another position to render said means non-responsive to variations in pressure in said straight air pipe and responsive to operation of said independent brake valve device, and valve mechanism normally establishing the communications through which said pilot fluid pressure, and the pressure of fluid in said brake pipe are controlled by the first named brake valve device and also communications through which said means are controlled from said independent brake valve device, said valve mechanism being movable to another position for closing said communications and for venting both the relay side and brake valve side of the communication through which said pilot fluid pressure is normally supplied to said relay.

45. In a fluid pressure brake system, in combination, means providing a communication through which fluid under pressure is supplied to effect an application of the brakes and through which fluid under pressure is released to effect a release of the brakes, a selector valve device for controlling said communication and being operable upon an increase of fluid pressure therein to close said communication and to establish a different communication through which fluid under pressure may be released to effect a release of the brakes independently of release of fluid under pressure from said first mentioned communication the operation of said selector valve device being independent of the fluid pressure in said communications.

46. In a fluid pressure brake system, in combination, a straight air pipe to which fluid under pressure is supplied to effect an application of the brakes and from which fluid under pressure is released to effect a release of the brakes, means responsive to straight air pipe pressure for controlling the degree of application of the brakes, a selector valve device having a first position in which it connects said means to said straight air pipe, and being operable to disconnect said means from said straight air pipe and to establish a communiaction through which fluid under pressure may be released from said means to release the brakes independently of release of fluid under pressure from said straight air pipe, and means operable independently of the pressure of fluid in said straight air pipe and in said communication for controlling the operation of said selector valve device.

47. In a brake system for a train comprising a locomotive and a plurality of cars, in combination, a train straight air pipe to which fluid under pressure is supplied to effect an application of the brakes both on the locomotive and on the cars, and from which fluid under pressure is released to effect a release of the brakes both on the locomotive and on the cars, a selector valve device on the locomotive operative in one position to permit the brakes on the locomotive to be controlled by straight air pipe pressure, and operative to another position independently of straight air pipe pressure to render straight air pipe pressure ineffective to control the brakes on the locomotive and to establish a communication through which the locomotive brakes may be controlled independently of the straight air pipe.

48. In a fluid pressure brake system, in combination, a brake control communication through which fluid under pressure is supplied to effect an application of the brakes and from which fluid under pressure is released to effect a release of the brakes, straight air means including a straight air pipe to which fluid under pressure is supplied and from which it is released, independent straight air means for establishing a fluid pressure, and a valve device controlling communication between said brake control communication and the straight air pipe on the one hand, and between the brake control communication and the independent means on the other hand.

49. In a fluid pressure brake system, in combination, means for establishing a communication through which fluid under pressure is supplied to effect an application of the brakes, a valve device operative upon a decrease of fluid pressure therein to effect a release of fluid under pressure from said communication, and another valve device operative in a normal position to connect said communication to a source of supply of fluid under pressure, and operative to a different position to disconnect said communication from said source and to establish a different communication through which the fluid pressure in said release valve device is adapted to be diminished.

50. In a fluid pressure brake system, in combination, a communication in which the pressure of fluid supplied thereto is adapted to be maintained, means responsive to the pressure of fluid in said communication for effecting an application of the brakes, and operative upon a reduction of the pressure of fluid in said communication to effect a release of the brakes, a control element so arranged that it may be moved to a brake releasing position by pressure manually applied thereto and being movable automatically to a free position upon the release of the manual pressure, and control means operative upon movement of said element to said brake releasing position for effecting a release of the brakes while the pressure of fluid is maintained in said communication, and operative upon movement of said element to said free position to effect a reapplication of the brakes to a degree corresponding to the pressure of fluid in said communication.

51. In a fluid pressure brake system, in combination, a communication in which the pressure of fluid supplied thereto is adapted to be maintained, means responsive to the pressure of fluid in said communication for effecting an application of the brakes, and operative upon a reduction of the pressure of fluid in said communication to effect a release of the brakes, a control element so arranged that it may be moved to a brake releasing position by pressure manually applied thereto and being movable automatically to a free position upon the release of the manual pressure, and control means operative upon movement of said element to said brake releasing position for effecting a release of the brakes while the pressure of fluid is maintained in said communication, and operative upon movement of said element to said free position to effect a reapplication of the brakes to a degree corresponding to the pressure of fluid in said communication, and a valve also controlled by a movement of said handle for controlling a communication through which fluid under pressure is released when the brakes are released by operation of said control element.

52. In a fluid pressure brake, in combination, a communication in which the pressure of fluid supplied thereto is adapted to be maintained, means responsive to the pressure of fluid in said communication for effecting application of the brakes, a control device having a plurality of horizontal positions and a plurality of vertical positions, valve means operative to establish a communication through which fluid under pressure is released to effect a release of the brakes while the pressure of fluid is maintained in said communication, and means controlled by movement of said control element to both horizontal and vertical positions for controlling the operation of said valve means.

53. In a fluid pressure brake system, in combination, straight air means for effecting an application of the brakes including a straight air pipe to which fluid under pressure is supplied and from which it is released, independent straight air means for also effecting an application of the brakes, and a movable abutment operable in one position to open a communication through which fluid under pressure supplied to the straight air pipe is effective in controlling a brake application, and operative in another position to close said communication and open another communication through which the independent straight air means is effective in controlling the brake application.

54. In a brake system for a railway train comprising a plurality of cars and a locomotive, in combination, means for effecting by automatic operation an application of the brakes on the locomotive and on the cars of the train, a control device on the locomotive provided with a handle movable in two different planes, and means controlled by the movement of said handle in both of said planes for controlling the application and the release of the brakes on the locomotive independently of the application and the release of the brakes on the cars.

55. In a vehicle brake system, in combination, a normally charged pipe, an automatic valve device operative upon a reduction of pressure in said pipe to effect an application of the brakes, a control device having a handle depressible to a releasing position by manual pressure and operative upon release of the manual pressure to automatically move to a free position, means operative in response to movement of said handle to the said releasing position for effecting a release of the brakes independently of operation of the automatic valve device, said means being operative to hold the brakes released upon release of said handle and movement thereof to the free position.

56. In a vehicle brake system, in combination, a normally charged pipe, an automatic valve device operative upon a reduction of pressure in said pipe to effect an application of the brakes, a control device having a handle depressible to a releasing position by manual pressure and operative upon release of the manual pressure to automatically move to a free position, means operative in response to movement of said handle to the releasing position for effecting a release of the brakes independently of a releasing operation of the automatic valve device, said means being operative to hold the brakes released upon release of said handle and movement thereof to the free position, and also being so arranged that upon a subsequent operation of said automatic valve device the brakes are reapplied with said handle in the free position.

57. In a fluid pressure brake system, in combination, a normally charged pipe, automatic valve means operative upon a reduction of pressure in said pipe to effect an application of the brakes, independent brake control means comprising a handle and a self-lapping valve mechanism operable to establish fluid pressures according to the degree of movement of said handle, and means for controlling the application of the brakes in response to movement of said handle independently of the operation of said automatic valve means, and being effective to vary the degree of application of the brakes subsequent to the initial application thereof by operation of the automatic valve means.

58. In a fluid pressure brake system, in combination, automatic valve means for effecting an application of the brakes, a control device having a handle movable from a release position into an application zone, and being depressible both in said release position and in said application zone, and means operative in response to depressing said handle in said release position for effecting a full release of the brakes independently of operation of said automatic valve means, and operable in response to depressing of said handle in said application zone for effecting a partial release of the brakes also independently of operation of said automatic means.

59. In a fluid pressure brake system, in combination, a brake cylinder, automatic valve means operative to establish a control fluid pressure to effect a supply of fluid under pressure to said brake cylinder, insuring valve means subject to said control pressure and to fluid at brake cylinder pressure for controlling an auxiliary means to insure the establishment of pressure in said brake cylinder, said insuring valve means being operative upon a predetermined unbalance between said control pressure and said brake cylinder pressure to effect the operation of said auxiliary means, independent brake control means operative to reduce brake cylinder pressure independently of operation of said automatic valve means, and means controlled by said independent brake control means for preventing development of said predetermined unbalance on said insuring valve means when brake cylinder pressure is independently reduced.

60. In a fluid pressure brake system, in combination, automatic valve means operative to effect an application of the brakes, and a manually operated control device for controlling the application of the brakes independently of operation of said automatic valve means, said independent device having a handle movable to a releasing position and to a locking position, and being operative when said handle is in said releasing position to effect a release of the brakes independently of operation of said automatic valve means, and being operative to prevent a release of the brakes when said handle is in said locking position except by operation of said automatic valve means.

61. In a fluid pressure brake system, in combination, a normally charged pipe, a triple valve device operative upon a service rate of reduction of pressure in said pipe to effect a supply of fluid under pressure through a communication to effect a service application of the brakes, an emergency valve device operative concurrently with said triple valve device upon an emergency rate of reduction of pressure in said pipe to also effect a supply of fluid under pressure through said communication to effect an emergency application of the brakes, a valve device for controlling the rate of flow of fluid through said communication, a manually operated control device for controlling the application of the brakes independently of operation of said triple valve device and said emergency valve device, and means for controlling said rate control valve device by operation of said manually operated control device.

62. In a fluid pressure brake system, in combination, a normally charged pipe, a first automatic valve means operative upon a service rate of reduction of pressure in said pipe to effect a service application of the brakes, a second automatic valve means operable concurrently with said first automatic valve means upon an emergency rate of reduction of pressure in said pipe to effect an emergency application of the brakes, an independent brake valve device having a handle movable in both a horizontal plane and a vertical plane, and means governed by movement of said handle in both said horizontal plane and said vertical plane for controlling the application of the brakes independently of operation of either said first or said second automatic valve means.

63. In a fluid pressure brake system, in combination, means providing a communication through which fluid under pressure is supplied to effect an application of the brakes, a first automatic valve means operative to supply fluid under pressure through said communication to effect a service application of the brakes, a second automatic valve means operative concurrently with said first automatic valve means to supply fluid under pressure through said communication to effect an emergency application of the brakes, independent brake control means operative to release fluid under pressure from said communication independently of operation of either said first or said second automatic valve means, and flow controlling means operative to control the rate of flow of fluid through said communication by said two automatic valve means and being operable to prevent the maintenance of pressure therein when being reduced by operation of said independent brake control means.

64. In a fluid pressure brake system, in combination, automatic means for effecting an application of the brakes by automatic operation, straight air means for effecting an application of the brakes by straight air operation, independent brake control means for controlling the application of the brakes independently of operation of either said automatic means or said straight air means, said independent brake control means having a handle depressible by manual pressure to effect a release of the brakes effected by operation of either said automatic means or said straight air means, and being operative to a free position when the manual pressure applied thereto is released, and means so constructed and arranged that when said handle is depressed to independently release the brakes and then permitted to move to said free position the release is maintained if the application was effected by operation of the automatic means, but the brakes are reapplied if the application was effected by operation of said straight air means.

65. In a fluid pressure brake system, in combination, straight air means for effecting an application of the brakes, automatic means for also effecting an application of the brakes, independent brake control means including a manually operable element having a plurality of operating positions and a locking position, and means so constructed and arranged that when said handle is in said locking position said straight air means is ineffective to effect an application of the brakes but said automatic means is effective to do so.

66. In a vehicle brake system, in combination, automatic means for effecting an application of the brakes, straight air means for effecting an application of the brakes, and a valve device operative in one position thereof to permit an application of the brakes to be effected by operation of either said straight air means or said automatic means, and being movable to another position to prevent an application by operation of said straight air means and to establish a communication through which a release of the brakes may be effected regardless of whether the brake application was initiated by operation of said straight air means or by operation of said automatic means.

67. In a vehicle brake system, in combination, a brake cylinder, straight air means for establishing a control fluid pressure, automatic means for also establishing a control fluid pressure, brake control means responsive to either of said fluid pressures for effecting a supply of fluid under pressure to said brake cylinder, insuring valve means adapted to be subject to either of said control fluid pressures and to fluid at brake cylinder pressure for insuring an effective application of the brakes in response to establishment of either of said control pressures, independent brake control means operative to reduce brake cylinder pressure independently of reduction of either of said control pressures, and means governed by operation of said independent brake control means for maintaining the pressure acting on said insuring valve means upon reduction in brake cylinder pressure.

68. In a fluid pressure brake system, in combination, a passage to which fluid under pressure is supplied to effect an application of the brakes, two movable abutments adapted to be moved by fluid pressure acting thereon, automatic means for controlling an application of the brakes, straight air means for controlling an application of the brakes, and means so constructed and arranged that one of said movable abutments controls communication between said automatic means and said pasasge, and both of said abutments control communication between either of said straight air means and independent means and said passage.

69. In a fluid pressure brake system, in combination, a passage to which fluid under pressure is supplied to effect an application of the brakes, automatic means for effecting a supply of fluid under pressure to said pasasge, straight air means for effecting a supply of fluid under pressure to said passage, independent means for effecting a supply of fluid under pressure to said passage, two movable abutments so arranged that one of said abutments controls communication between said automatic means and said pasasge, and both of said abutments control communication between either of said straight air means and independent means and said passage, and a selector valve device operative to also control communication between said straight air means and said passage.

70. In a fluid pressure brake system, in combination, a passage to which fluid under pressure is supplied to effect an application of the brakes, two movable abutments adapted to be moved by fluid pressure acting thereon, automatic control means for effecting an application of the brakes, straight air control means for controlling an application of the brakes, independent control means for controlling an application of the brakes, and means so constructed and arranged that one of said movable abutments controls communication between said automatic means and said passage, and both of said abutments control communication between either of said straight air means and independent means and said passage, and a release valve device operative to release fluid under pressure from said pasasge independently of operation of at least two of said three control means.

71. In a fluid pressure brake system, in combination, a passage to which fluid under pressure is supplied to effect an application of the brakes, automatic means for supplying fluid under pressure, straight air means for supplying fluid under pressure, independent means for supplying fluid under pressure, a plurality of check valve devices for controlling communication between said three supplying means and said passage, a release valve device operative to release fluid under pressure from said passage to effect a release of the brakes, and a selector valve device operable upon an increase of fluid pressure therein to render said release valve device effective to release fluid under pressure from said passage, said parts being so constructed and arranged that the release of fluid from said passage is independent of the operation of either said straight air means or said automatic means.

72. In a fluid pressure brake system, in combination, a brake cylinder, straight air means for effecting a supply of fluid under pressure to the brake cylinder, automatic means for effecting a supply of fluid under pressure to the brake cylinder, independent control means operative to reduce brake cylinder pressure and to establish independently a control pressure, and a brake application insuring valve device having one chamber to which fluid under pressure may be supplied either by said straight air means or by said automatic means, and having another chamber to which fluid may be supplied at brake cylinder pressure or by operation of said independent control means, said insuring valve means being operable upon a predetermined unbalance in the pressures in said two chambers to control an auxiliary means to insure an application of the brakes when once initiated.

73. A brake control device comprising, in combination, a manually operable handle movable in both horizontal and vertical planes, a brake releasing valve means controllable by movement of said handle in said vertical plane, and a brake application means controllable by movement of said handle in a horizontal plane.

74. A brake control device comprising, in combination, a handle movable in a vertical plane between a depressed position and an elevated position, and movable in a horizontal plane between a release position and a plurality of positions in an application zone, valve means controllable by movement of said handle in said vertical plane for controlling a communication through which fluid under pressure is supplied and released to control an application and release of the brakes, and self-lapping valve means conditioned according to the degree of movement of said handle from said release position into said application zone for controlling the degree of application of the brakes.

75. A brake control device comprising, in combination, a handle movable in a vertical plane between a depressed position and an elevated position, and movable in a horizontal plane between a release position and a plurality of positions in an application zone, valve means controllable by movement of said handle in said vertical plane for controlling a communication through which fluid under pressure is supplied and released to control an application and release of the brakes, and self-lapping valve means conditioned according to the degree of movement of said handle from said release position into said application zone for controlling the degree of application of the brakes, and a valve also controllable by movement of said handle in said horizontal plane for controlling a communication through which said self-lapping valve device is effective in controlling the degree of application of the brakes.

76. A brake control device comprising, in combination, a handle movable both in a vertical plane and in a horizontal plane, valve means controlled by movement of said handle in said vertical plane for controlling a communication through which fluid under pressure is supplied and released in controlling external brake control means, self-lapping valve means controllable by movement of said handle in a portion of said horizontal plane for establishing fluid pressures in a chamber in said control device to control the degree of application of the brakes, a valve controlling communication between said chamber and said external brake control means, and being operable in a certain position of said handle in said horizontal plane to close communication between said chamber and said external brake control means, and means for locking said handle in said certain position.

ELLIS E. HEWITT.
DONALD L. McNEAL.

CERTIFICATE OF CORRECTION.

Patent No. 2,173,940. September 26, 1939.

ELLIS E. HEWITT, ET AL.

It is hereby certified that error appears in the printed specification of the above numbered patent requiring correction as follows: Page 17, second column, line 15, claim 1, after the word "brake" insert valve; page 19, first column, line 19, claim 16, for "applying" read supplying; and that the said Letters Patent should be read with this correction therein that the same may conform to the record of the case in the Patent Office.

Signed and sealed this 16th day of January, A. D. 1940.

Henry Van Arsdale,
Acting Commissioner of Patents.

(Seal)